(12) United States Patent
Kato

(10) Patent No.: US 10,726,322 B2
(45) Date of Patent: Jul. 28, 2020

(54) WIRELESS COMMUNICATION DEVICE AND ARTICLE EQUIPPED WITH THE SAME

(71) Applicant: Murata Manufacturing Co., Ltd., Nagaokakyo-shi, Kyoto-fu (JP)

(72) Inventor: Noboru Kato, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 0 days.

(21) Appl. No.: 15/869,530

(22) Filed: Jan. 12, 2018

(65) Prior Publication Data
US 2018/0137399 A1 May 17, 2018

Related U.S. Application Data

(63) Continuation of application No. PCT/JP2016/070861, filed on Jul. 14, 2016.

(30) Foreign Application Priority Data

Jul. 21, 2015 (JP) .................................. 2015-143881
Feb. 25, 2016 (JP) .................................. 2016-034658

(51) Int. Cl.
*G06K 19/077* (2006.01)
*H01Q 1/38* (2006.01)
(Continued)

(52) U.S. Cl.
CPC . *G06K 19/07749* (2013.01); *G06K 19/07771* (2013.01); *H01Q 1/2216* (2013.01);
(Continued)

(58) Field of Classification Search
CPC ......... G06K 19/07749; G06K 19/0772; G06K 19/077; G06K 19/07771; H01Q 1/2216;
(Continued)

(56) References Cited

U.S. PATENT DOCUMENTS 6,018,299 A 1/2000 Eberhardt
6,588,672 B1 7/2003 Usami
(Continued)

FOREIGN PATENT DOCUMENTS

JP 2002-519771 A 7/2002
JP 2005-191705 A 7/2005
(Continued)

OTHER PUBLICATIONS

International Search Report issued in International Application No. PCT/JP2016/070861, dated Aug. 30, 2016.
(Continued)

*Primary Examiner* — Brian Wilson
(74) *Attorney, Agent, or Firm* — Arent Fox LLP

(57) ABSTRACT

A wireless communication device is provided that has an RFIC element including first and second terminal electrodes, a first radiation electrode connected to the first terminal electrode of the RFIC element, a second radiation electrode disposed in the same layer as the first radiation electrode independently of the first radiation electrode and connected to the second terminal electrode of the RFIC element, and a back surface electrode disposed oppositely to the second radiation electrode at a distant and connected to the second radiation electrode. Moreover, an area of a portion of the back surface electrode opposite to the first radiation electrode is smaller than an area of a portion of the back surface electrode opposite to the second radiation electrode.

20 Claims, 33 Drawing Sheets

(51) Int. Cl.
  *H01Q 9/26*   (2006.01)
  *H01Q 9/42*   (2006.01)
  *H01Q 1/48*   (2006.01)
  *H01Q 1/22*   (2006.01)
  *H01Q 19/00*  (2006.01)
  *H01Q 19/26*  (2006.01)

(52) U.S. Cl.
  CPC ............. *H01Q 1/2225* (2013.01); *H01Q 1/38* (2013.01); *H01Q 1/48* (2013.01); *H01Q 9/26* (2013.01); *H01Q 9/42* (2013.01); *H01Q 19/005* (2013.01); *H01Q 19/26* (2013.01); *G06K 19/0772* (2013.01)

(58) Field of Classification Search
  CPC .......... H01Q 1/2225; H01Q 9/42; H01Q 1/48; H01Q 19/005; H01Q 19/26; H01Q 1/38; H01Q 9/26
  USPC ............................................. 340/572.1–572.9
  See application file for complete search history.

(56) References Cited

U.S. PATENT DOCUMENTS

| | | | |
|---|---|---|---|
| 7,911,404 B2 | 3/2011 | Yamagajo et al. | |
| 8,232,923 B2 | 7/2012 | Yang | |
| 8,397,994 B2* | 3/2013 | Kai ................. | G06K 19/07749 235/487 |
| 8,477,079 B2* | 7/2013 | Carr .................... | H01Q 1/2225 343/700 MS |
| 8,991,713 B2 | 3/2015 | Dokai et al. | |
| 8,994,605 B2 | 3/2015 | Kato | |
| 9,117,157 B2 | 8/2015 | Kato | |
| 9,123,996 B2 | 9/2015 | Dokai et al. | |
| 9,172,130 B2* | 10/2015 | Forster ................. | H01Q 1/2225 |
| 2006/0032926 A1* | 2/2006 | Baba ................ | G06K 19/07749 235/492 |
| 2008/0042848 A1* | 2/2008 | Roberts ................... | B60R 13/10 340/572.7 |
| 2008/0122628 A1 | 5/2008 | Kai et al. | |
| 2008/0122629 A1 | 5/2008 | Yamagajo et al. | |
| 2008/0150726 A1 | 6/2008 | Yamagajo et al. | |
| 2008/0231458 A1* | 9/2008 | Fein ................. | G06K 19/07749 340/572.7 |
| 2009/0079568 A1* | 3/2009 | Forster ............ | G06K 19/07749 340/572.1 |
| 2009/0305635 A1 | 12/2009 | Osamura et al. | |
| 2010/0066636 A1* | 3/2010 | Carr ........................ | H01Q 1/38 343/904 |
| 2011/0080331 A1 | 4/2011 | Kato | |
| 2011/0279326 A1 | 11/2011 | Dokai et al. | |
| 2011/0284641 A1 | 11/2011 | Yang | |
| 2013/0050047 A1 | 2/2013 | Carr | |
| 2013/0200162 A1 | 8/2013 | Dokai et al. | |
| 2014/0131457 A1 | 5/2014 | Kato | |
| 2015/0364831 A1 | 12/2015 | Li et al. | |

FOREIGN PATENT DOCUMENTS

| | | |
|---|---|---|
| JP | 2006-222873 A | 8/2006 |
| JP | 2009-26044 A | 2/2009 |
| JP | 2010-74809 A | 4/2010 |
| JP | 2011-9840 A | 1/2011 |
| JP | 2011-13795 A | 1/2011 |
| JP | 2011-76567 A | 4/2011 |
| JP | 2012-137894 A | 7/2012 |
| JP | 2012-146000 A | 8/2012 |
| JP | 5170156 B2 | 3/2013 |
| JP | 2014-143591 A | 8/2014 |
| JP | 2014-220739 A | 11/2014 |
| WO | WO 2006/134658 A1 | 12/2006 |
| WO | WO 2007/000807 A1 | 1/2007 |
| WO | WO 2007/029296 A1 | 3/2007 |
| WO | WO 2008/096574 A1 | 8/2008 |
| WO | WO 2012/096365 A1 | 7/2012 |

OTHER PUBLICATIONS

International Search Report issued in International Application No. PCT/JP2016/070862, dated Sep. 13, 2016.
Written Opinion of the International Searching Authority issued in International Application No. PCT/JP2016/070861, dated Aug. 30, 2016.
Written Opinion of the International Searching Authority issued in International Application No. PCT/JP2016/070862, dated Sep. 13, 2016.

* cited by examiner

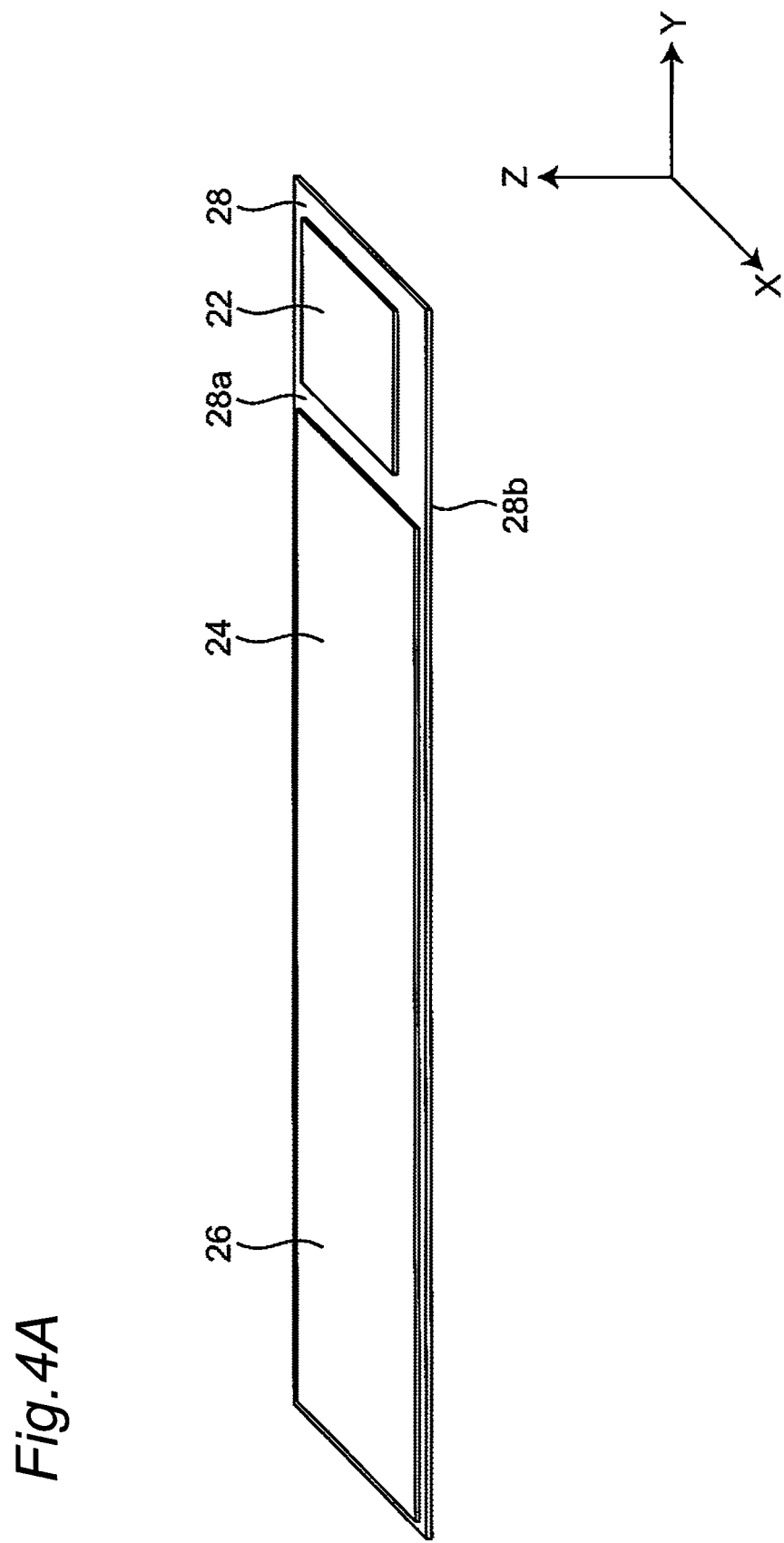

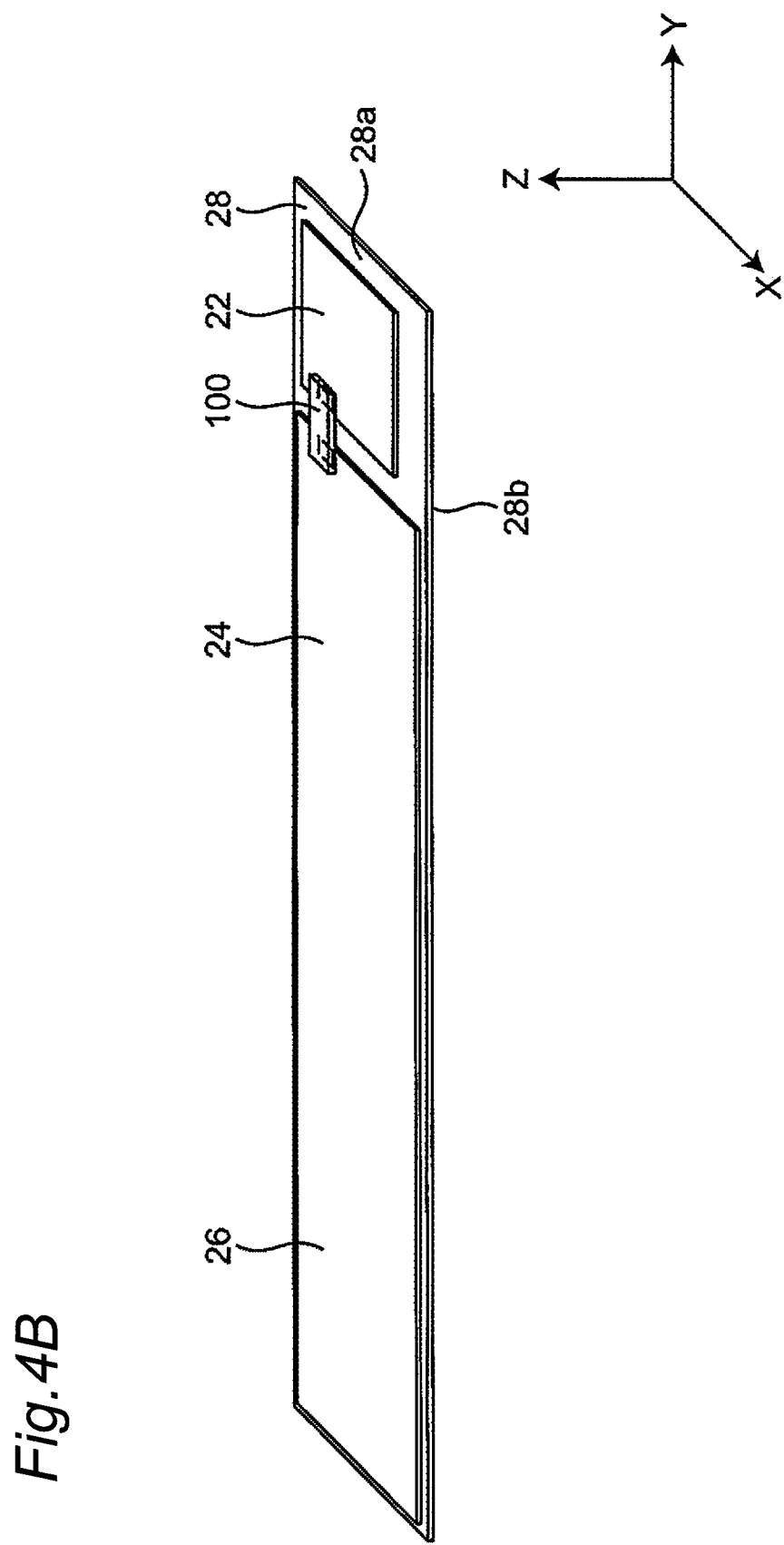

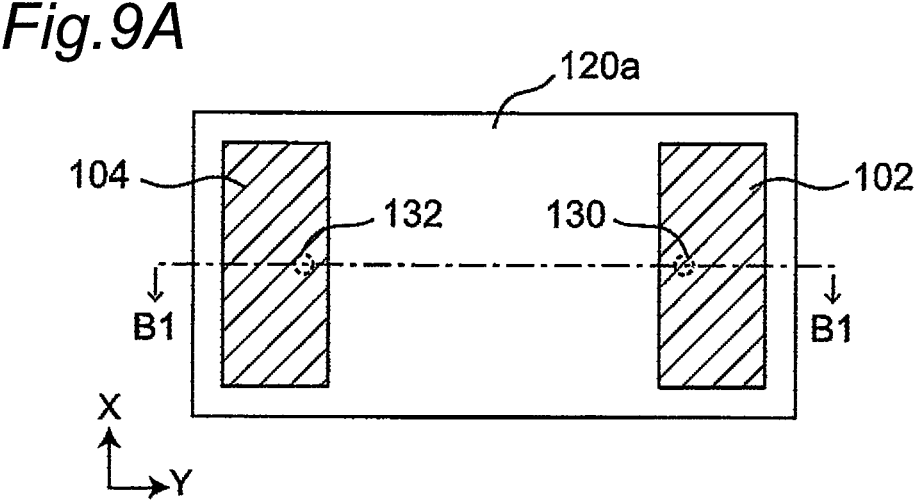
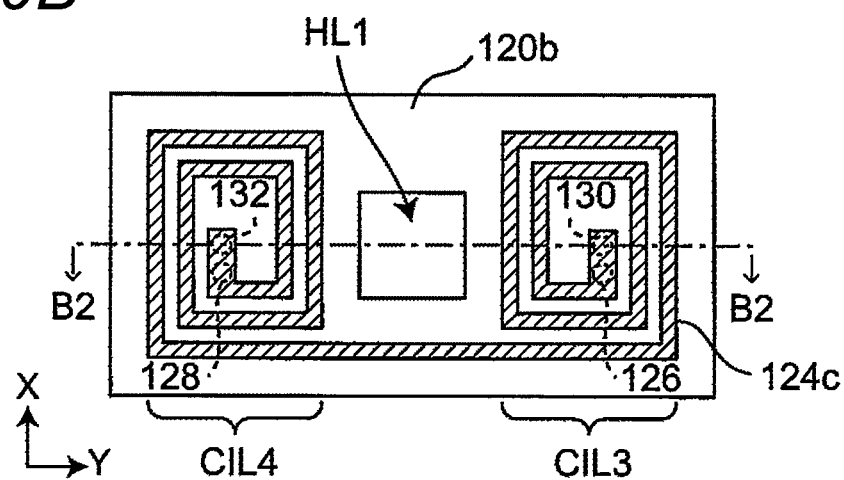
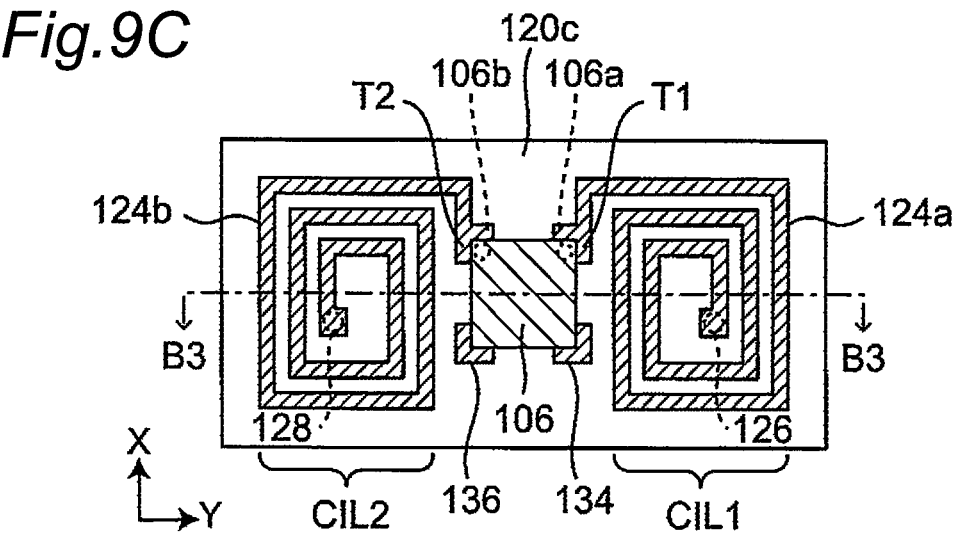

WIRELESS COMMUNICATION DEVICE AND ARTICLE EQUIPPED WITH THE SAME

CROSS REFERENCE TO RELATED APPLICATIONS

The present application is a continuation of PCT/JP2016/070861 filed Jul. 14, 2016, which claims priority to Japanese Patent Application No. 2016-034658, filed Feb. 25, 2016, and Japanese Patent Application No. 2015-143881, filed Jul. 21, 2015, the entire contents of each of which are incorporated herein by reference.

TECHNICAL FIELD

The present disclosure relates to a wireless communication device, and, more particularly, to a wireless communication device capable of wireless communication even when attached to a metal surface of an article, and an article equipped with the same.

BACKGROUND

Wireless communication devices capable of wireless communication even when attached to a metal surface of an article include a device disclosed in Patent Document 1 (identified below), for example.

The wireless communication device disclosed in Patent Document 1 includes a dielectric element body, an upper surface electrode disposed on an upper surface of the dielectric element body, and a lower surface electrode disposed on a lower surface of the dielectric element body and electrically connected to the upper surface electrode. These upper and lower electrodes are provided as one metal pattern extending from the lower surface to the upper surface of the dielectric element body. The upper electrode is provided with an opening and a slit extending from the opening to a side end of the electrode. Terminals of a wireless IC element are connected to each of facing portions of the slit.

A circumference of the opening functions as a loop electrode. When a high-frequency signal is received, a current is induced in the loop electrode, and the current is supplied through the facing portions of the slit to the wireless IC element. In this case, the loop electrode achieves impedance matching between the metal pattern and the wireless IC element.

Even when such a wireless communication device is attached on the bottom electrode side to a metal surface of an article, communication characteristics do not change. Therefore, the device can perform wireless communication whether it is attached to a metal surface of an article or not attached to the article.

Patent Document 1: Japanese Patent No. 5170156.

SUMMARY OF THE INVENTION

A communication device is needed that is capable of wireless communication even when attached to a metal surface of an article and that has improved communication capabilities. Therefore, a wireless communication device capable of radiating radio waves with higher radiation efficiency is needed.

Therefore, an object of the present disclosure is to provide a wireless communication device that is capable of wireless communication even when attached to a metal surface of an article and capable of radiating radio waves with higher radiation efficiency.

Accordingly, a wireless communication device is provided that includes an RFIC element including first and second terminal electrodes; a first radiation electrode connected to the first terminal electrode of the RFIC element; a second radiation electrode disposed in the same layer or plane as the first radiation electrode independently of the first radiation electrode and connected to the second terminal electrode of the RFIC element; and a back surface electrode disposed oppositely to the second radiation electrode at a distant and connected to the second radiation electrode. Moreover, an area of a portion of the back surface electrode opposite to the first radiation electrode is smaller than an area of a portion of the back surface electrode opposite to the second radiation electrode.

According to further exemplary aspect, there is provided an article at least partially having a metal surface and including a wireless communication device attached to the metal surface, wherein the wireless communication device includes an RFIC element including first and second terminal electrodes, a first radiation electrode connected to the first terminal electrode of the RFIC element, a second radiation electrode disposed in the same layer or plane as the first radiation electrode independently of the first radiation electrode and connected to the second terminal electrode of the RFIC element, and a back surface electrode disposed oppositely to the second radiation electrode at a distant and connected to the second radiation electrode. In this aspect, when the wireless communication device is attached to the metal surface, the back surface electrode faces the metal surface. In addition, an area of a portion of the back surface electrode opposite to the first radiation electrode is smaller than an area of a portion of the back surface electrode opposite to the second radiation electrode.

According to the present disclosure, the wireless communication device is capable of wireless communication even when attached to a metal surface of an article and capable of radiating radio waves with higher radiation efficiency.

BRIEF DESCRIPTION OF DRAWINGS

FIG. 4A is a view for explaining a fabrication step of the wireless communication module.

FIG. 4B is a view for explaining a fabrication step of the wireless communication module, following FIG. 4A.

FIG. 9A is a top view of an upper insulating layer in the RFIC element configured as a multilayer substrate.

FIG. 9B is a top view of a middle insulating layer in the RFIC element.

FIG. 9C is a top view of a lower insulating layer in the RFIC element.

DETAILED DESCRIPTION OF EXEMPLARY EMBODIMENTS

Figure 1:
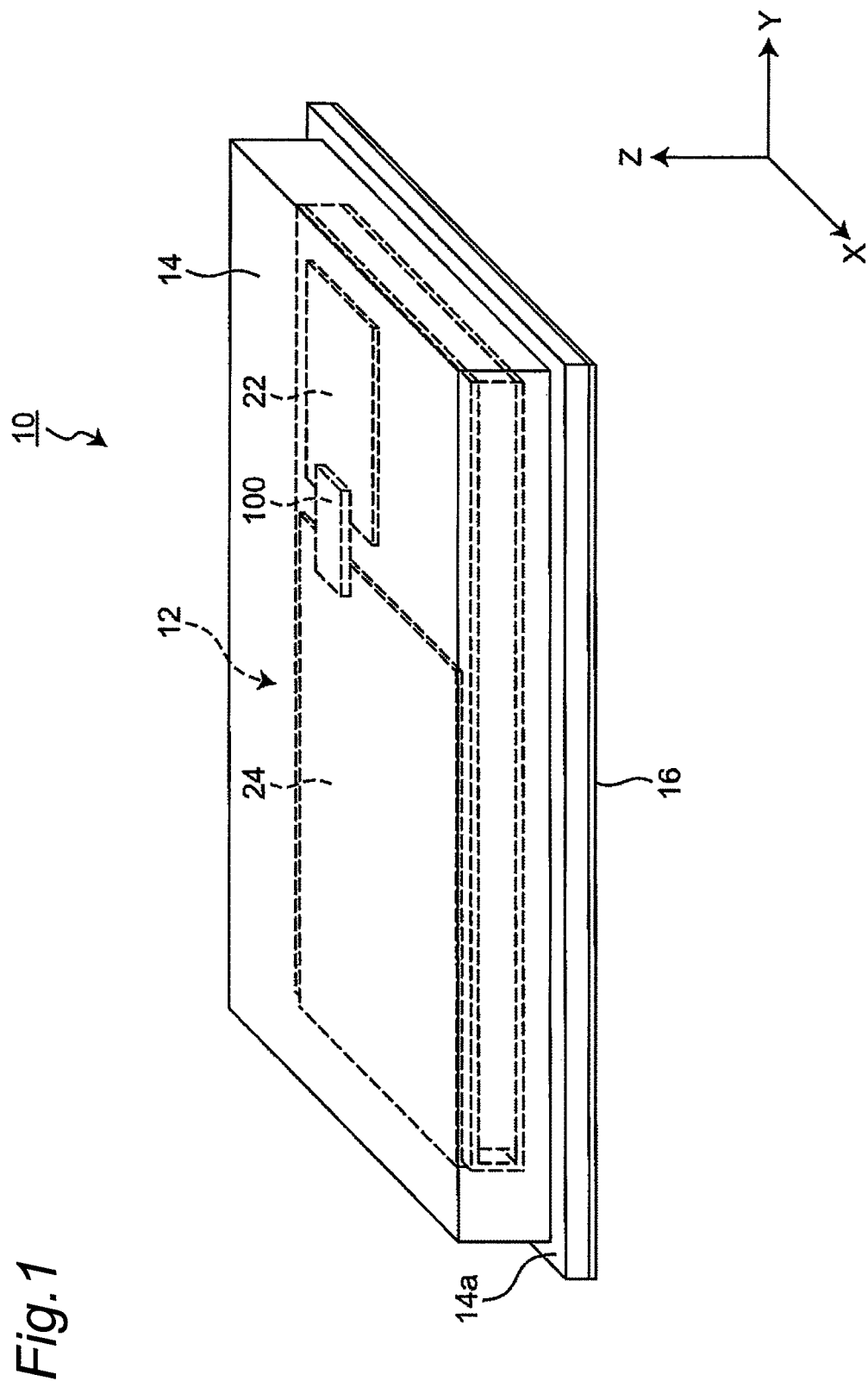
FIG. 1 is a perspective view of a wireless communication device according to an exemplary embodiment.

A wireless communication device according to an exemplary aspect has an RFIC element including first and second terminal electrodes, a first radiation electrode connected to the first terminal electrode of the RFIC element, a second radiation electrode disposed in the same layer as the first radiation electrode independently of the first radiation electrode and connected to the second terminal electrode of the RFIC element, and a back surface electrode disposed oppositely to the second radiation electrode at a distant and connected to the second radiation electrode, wherein an area of a portion of the back surface electrode opposite to the first radiation electrode is smaller than an area of a portion of the back surface electrode opposite to the second radiation electrode.

According to the aspect, the wireless communication device is capable of wireless communication even when attached to a metal surface of an article and capable of radiating radio waves with higher radiation efficiency.

The wireless communication device may have a dielectric substrate including a front surface and a back surface, wherein the first and second radiation electrodes may be disposed on the front surface of the dielectric substrate, and wherein the back surface electrode is disposed on the back surface of the dielectric substrate.

The dielectric substrate, the first radiation electrode, the second radiation electrode, the back surface electrode, and the RFIC element may have flexibility. As a result, close contact can be achieved even when the device is attached to a flat surface or a curved surface, and the high-frequency transmission characteristics between the article and the wireless communication device are maintained without change. Therefore, the wireless communication device can implement a communication capability without being affected by the shape of the article to which the device is attached.

An air layer may be present between the first/second radiation electrodes and the back surface electrode. In this case, a stray capacitance between the first radiation electrode and the back surface electrode becomes smaller (as compared to when a dielectric (object) exists therebetween). Consequently, the first radiation electrode can radiate radio waves with higher radiation efficiency.

The back surface electrode and the second radiation electrode may be made up of one metal film extending from the back surface side to the front surface side of the dielectric substrate. As a result, a high-frequency transmission loss is suppressed between the back surface electrode and the second radiation electrode. Therefore, it is not necessary to achieve impedance matching therebetween.

The second radiation electrode and the radiation electrode may be made up of one metal sheet folded at one end of the dielectric substrate, wherein the one end of the dielectric substrate may be provided with a core member having a rigidity higher than the dielectric substrate and extending in an extending direction of a fold line of the metal sheet. This core member suppresses a deformation of the dielectric substrate in the folded portion of the metal sheet, so that cracking is restrained from occurring in the folded portion of the metal sheet. As a result, the electric connection characteristics are maintained between the second radiation electrode and the radiation electrode.

The back surface electrode may be disposed not to be opposite to the first radiation electrode. As a result, the stray capacitance is minimized between the first radiation electrode and the back surface electrode, and the first radiation electrode can radiate radio waves with higher radiation efficiency.

The RFIC element may include an element substrate including the first and second terminal electrodes, an RFIC chip disposed on the element substrate, and a matching circuit disposed on the element substrate and achieving impedance matching between the RFIC chip and the first/second radiation electrodes. As a result, the impedance matching can be achieved between the RFIC chip and the first and second radiation electrodes. Therefore, the wireless communication device can radiate radio waves with higher radiation efficiency.

The first radiation electrode may have a width smaller than that of the second radiation electrode and extends in a direction away from the RFIC element. As a result, the first radiation electrode can radiate radio waves with strong radio field intensity as compared to the second radiation electrode.

When the wireless communication device has a first direction that is a direction of the first and second radiation electrodes facing each other in the same layer and a second direction orthogonal to the first direction in the same layer, the first radiation electrode may have a size in the first direction smaller than a size in the second direction, and the second radiation electrode may be connected to the back surface electrode in a portion on the side opposite in the first direction to a portion facing the first radiation electrode in the first direction. As a result, the direction of the current flowing through the first radiation electrode differs by 90 degrees from the direction of the current flowing through the second radiation electrode, and consequently, the wireless communication device can perform wireless communication at a long distance of 9 m or more, for example.

The second radiation electrode may include a first notch disposed at one end in the second direction and extending toward a center in the second direction. As a result, the communication frequency band of the wireless communication device can be expanded.

The second radiation electrode may include a second notch disposed at the other end in the second direction and extending toward the center in the second direction, and the first notch and the second notch may be arranged at an interval in the first direction. As a result, the communication frequency band of the wireless communication device can be expanded.

In the first direction, the size of the first radiation electrode may be smaller than 1/50 of the size of the second radiation electrode. As a result, the direction of the current flowing through the first radiation electrode more reliably differs by 90 degrees from the direction of the current flowing through the second radiation electrode.

In the first direction, the size of the first radiation electrode may be smaller than 1/100 of the size of the second radiation electrode. As a result, the direction of the current flowing through the first radiation electrode furthermore reliably differs by 90 degrees from the direction of the current flowing through the second radiation electrode.

When the first radiation electrode has the size in the first direction smaller than the size in the second direction, the first radiation electrode may include a bent portion extending in the first direction from each of both ends in the second direction. As a result, even when the size of the wireless communication device in the second direction is limited, a long communication distance can be achieved.

The first radiation electrode may include a through-hole. As a result, the stray capacitance between the first radiation electrode and the backside electrode decreases so that the radiation efficiency of the radio waves of the first radiation electrode is further improved.

The wireless communication device may have an attachment part disposed oppositely to the back surface electrode, made of a non-magnetic metallic, and used at the time of attachment to an article. As a result, the wireless communication device attached to any article can perform wireless communication in the same way.

The attachment part may have a ring shape. As a result, the wireless communication device can be mounted on a wrist or an ankle of an animal, for example.

An article according to further exemplary aspect at least partially having a metal surface and including a wireless communication device attached to the metal surface. The wireless communication device has an RFIC element including first and second terminal electrodes, a first radiation electrode connected to the first terminal electrode of the RFIC element, a second radiation electrode disposed in the same layer as the first radiation electrode independently of the first radiation electrode and connected to the second terminal electrode of the RFIC element, and a back surface electrode disposed oppositely to the second radiation electrode at a distant and connected to the second radiation electrode. The wireless communication device is attached to the metal surface such that the back surface electrode faces the metal surface, and an area of a portion of the back surface electrode opposite to the first radiation electrode is smaller than an area of a portion of the back surface electrode opposite to the second radiation electrode.

According to the aspect, the wireless communication device is capable of wireless communication even when attached to a metal surface of an article and capable of radiating radio waves with higher radiation efficiency. The wireless communication device can perform long-distance wireless communication by using the metal surface as an antenna.

the metal surface of the article may be a surface of a non-magnetic metal material. Comparing to the case of a surface of a magnetic metal material such as steel, the wireless communication device can perform long-distance wireless communication.

Exemplary embodiments of the present disclosure will now be described with reference to the drawings.

FIG. 1 is a perspective view of a wireless communication device according to an exemplary embodiment. For purposes of the explanation of the exemplary embodiment, the drawings show an X-Y-Z coordinate system including X, Y and Z axes orthogonal to each other. In this description, Z-, X-, and Y-axis directions are defined as a thickness direction, a width direction (second direction), and a length direction (first direction), respectively, of the wireless communication device 10.

In particular, a wireless communication device 10 shown in FIG. 1 is an RFID (Radio Frequency Identification) tag performing wireless communication at a carrier frequency of the UHF band, for example, 900 MHz, and is attached to various articles before use. Although described later in detail, the wireless communication device 10 according to this embodiment is configured for wireless communication even when attached to a metal surface of an article (e.g., a metal body).

As shown in FIG. 1, the wireless communication device 10 includes a wireless communication module 12 performing wireless communication, a protective case 14 housing and protecting the wireless communication module 12, and a seal member 16 for attaching the protective case 14 to an article.

The wireless communication module 12 will be described later.

The protective case 14 is made of a flexible material, for example, an epoxy resin, and houses the wireless communication module 12 such that the module 12 is entirely covered. The protective case 14 also includes an attachment part 14*a* attached to the article. The attachment part 14*a* is provided with the seal member 16 for attaching the wireless communication device 10 to the article.

Figure 2:
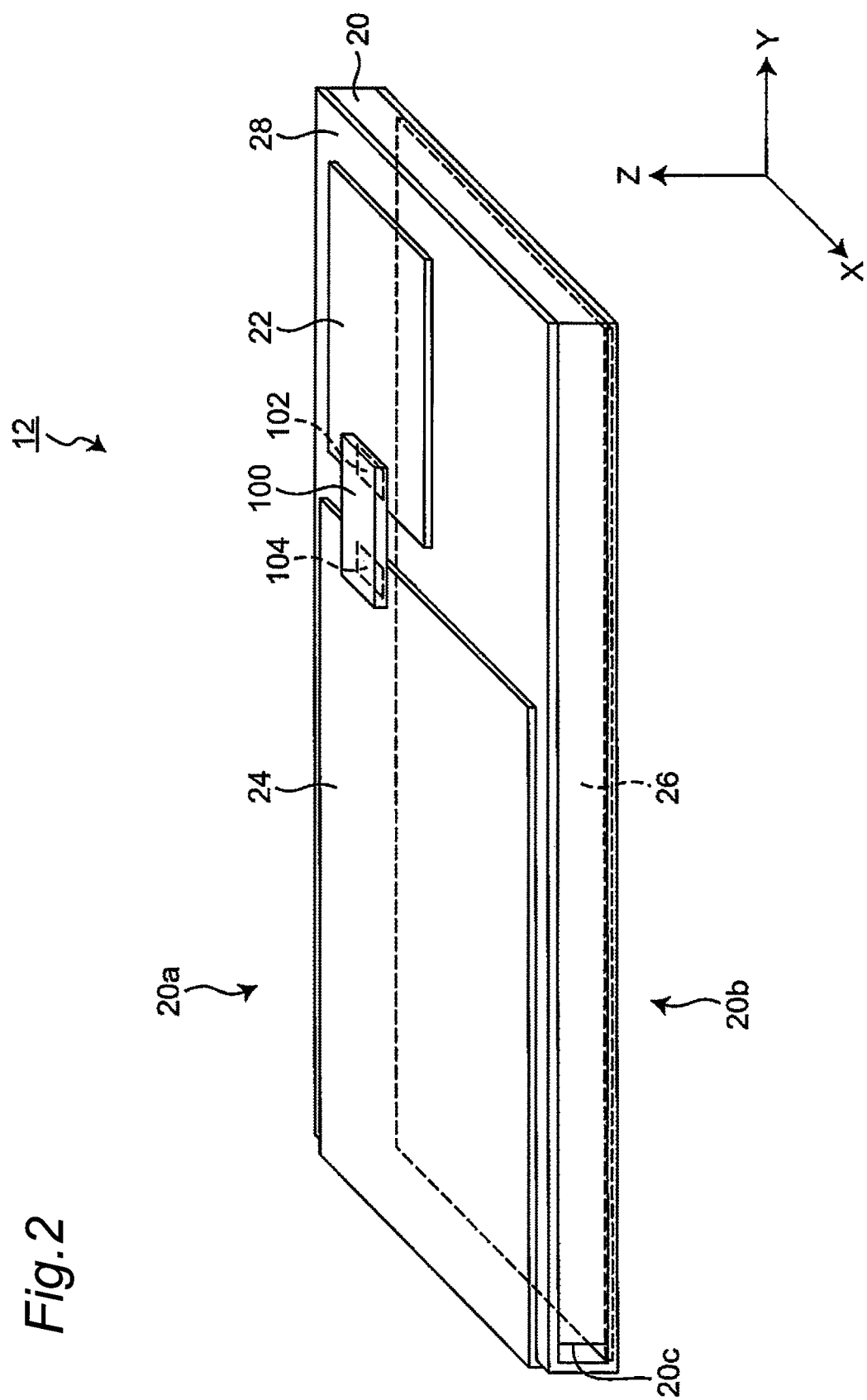
FIG. 2 is a perspective view of a wireless communication module of the wireless communication device.
Figure 3:
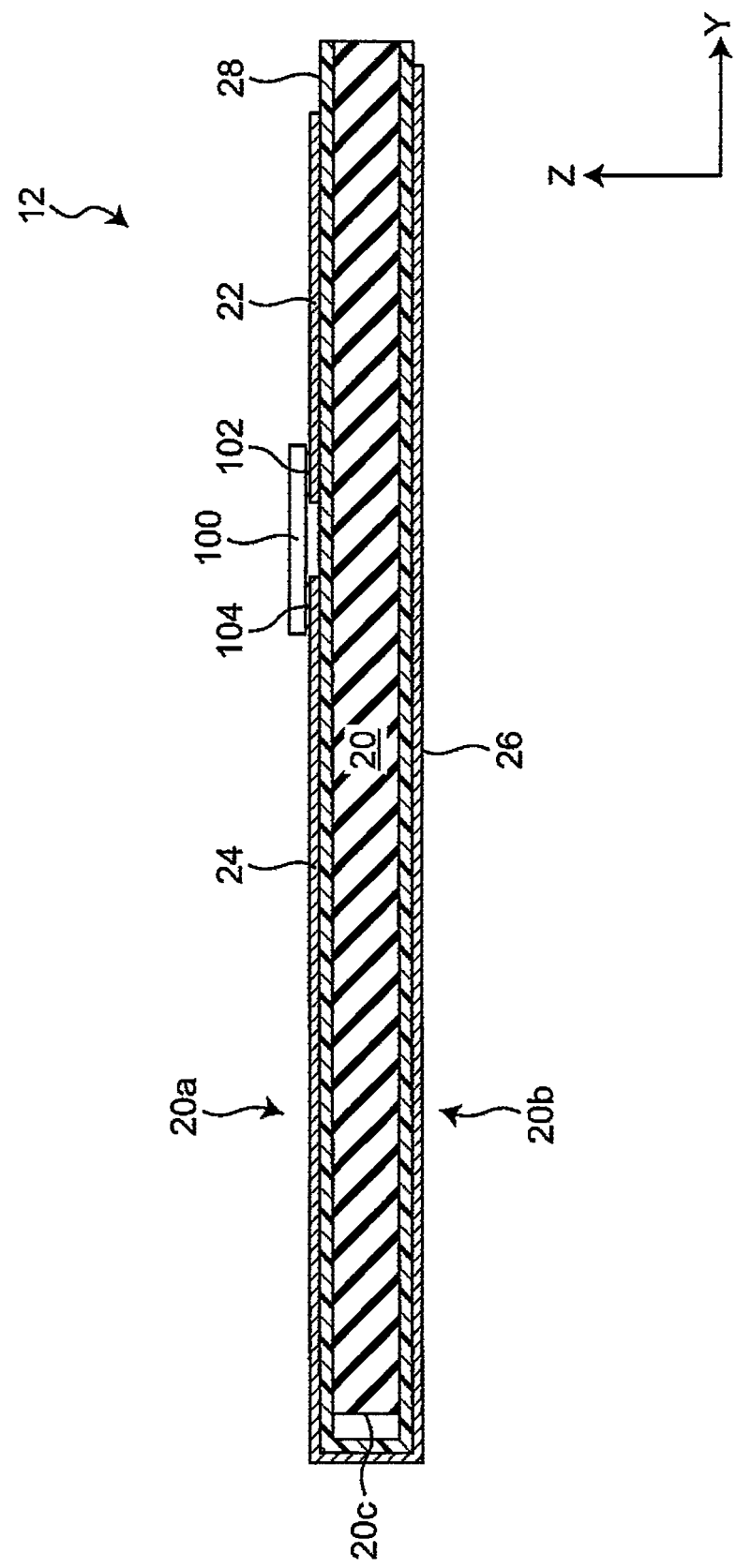
FIG. 3 is a cross-sectional view of the wireless communication module.

FIG. 2 is a perspective view of the wireless communication module 12 of the wireless communication device. FIG. 3 is a cross-sectional view of the wireless communication module 12.

As shown in FIGS. 2 and 3, the wireless communication module 12 includes a dielectric substrate 20, first and second radiation electrodes 22, 24 disposed on a front surface 20*a* side of the dielectric substrate 20, and a back surface electrode 26 disposed on a back surface 20*b* side of the dielectric substrate 20 and connected to the second radiation electrode 24. Thus, according to the exemplary aspect, the first and second radiation electrodes 22, 24 are disposed in the same plane or layer, while the back surface electrode 26 is disposed at a distance from these radiation electrodes 22, 24 in the thickness or Z direction of the device 10. The wireless communication module 12 also has an RFIC (Radio Frequency Integrated Circuit) element 100 disposed on the front surface 20*a* side of the dielectric substrate 20.

The dielectric substrate 20 of the wireless communication module 12 has a rectangular thin plate shape in a planar view including the front surface 20*a* and the back surface 20*b* and is made of a dielectric material having a low permittivity (preferably a relative permittivity of 10 or less). The dielectric substrate 20 is made of a dielectric material such as polyethylene terephthalate (PET), fluorine resin, urethane resin, and paper, for example. The dielectric substrate 20 may be made of a magnetic material.

According to the exemplary aspect, the first and second radiation electrodes 22, 24 disposed on the front surface 20*a* side of the dielectric substrate 20 are copper films or aluminum films, for example, and are made of a flexible and conductive material. In the case of this embodiment, the first radiation electrode 22 and the second radiation electrode 24 have a rectangular shape.

The first radiation electrode 22 is located in a portion of the dielectric substrate 20 on one side in the length direction (Y-axis direction) of the wireless communication device 10. The second radiation electrode 24 is located in a portion of the dielectric substrate 20 on the other side in the length direction independently of the first radiation electrode 22, i.e., separately at a distance from the first radiation electrode 22 in terms of shape. Therefore, the length direction of the wireless communication device 10 coincides with the facing direction of the first and second radiation electrodes 22, 24. The first radiation electrode 22 and the second radiation electrode 24 are not galvanically connected to each other on the front surface of the dielectric substrate 20. Thus, as shown the first radiation electrode 22 is not physically connected to the second radiation electrode 24. As described in detail later, a first terminal electrode 102 of the RFIC element 100 is connected to the first radiation electrode 22, and a second terminal electrode 104 is connected to the second radiation electrode 24.

The back surface electrode 26 disposed on the back surface 20*b* side of the dielectric substrate 20 is a copper film or an aluminum film, for example, and is made of a flexible and conductive material. According to this exemplary embodiment, the back surface electrode 26 has a rectangular shape and is disposed substantially entirely over the back surface 20*b* of the dielectric substrate 20. The back surface electrode 26 is connected to a portion of the second radiation electrode 24 on the side opposite to the portion of the second radiation electrode 24 facing the first radiation electrode 22.

Moreover, the second radiation electrode 24 and the back surface electrode 26 are integrated as described in detail later.

In the case of this exemplary embodiment, due to a manufacturing method of the wireless communication module 12, the first and second radiation electrodes 22, 24 and the back surface electrode 26 are disposed via a support film 28 on the dielectric substrate 20. The manufacturing method of the wireless communication module 12 will be described.

Specifically, as shown in FIG. 4A, the first and second radiation electrodes 22, 24 and the back surface electrode 26 are first formed on a front surface 28*a* of a belt-like support film 28 made of a flexible material such as polyethylene terephthalate. The second radiation electrode 24 and the back surface electrode 26 are made up of one belt-shaped metal film.

As shown in FIG. 4B, the RFIC element 100 is then attached onto the support film 28 in a state of being connected to the first radiation electrode 22 and the second radiation electrode 24. More specifically, the RFIC element 100 is mounted on the support film 28 via a conductive bonding material such as solder.

Figure 4C:
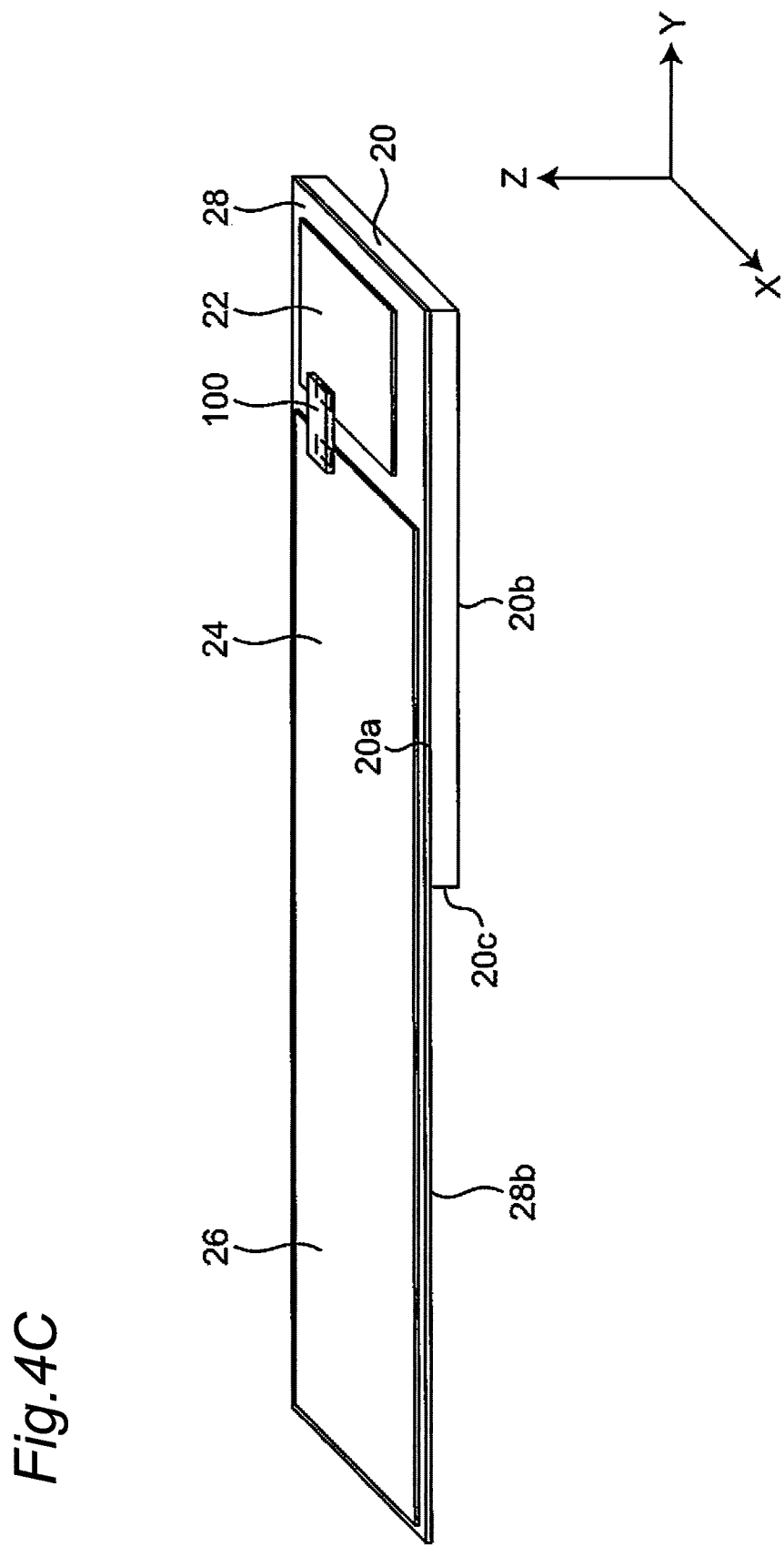
FIG. 4C is a view for explaining a fabrication step of the wireless communication module, following FIG. 4B.

Subsequently, as shown in FIG. 4C, the front surface 20*a* side of the dielectric substrate 20 is affixed to a portion of the back surface 28*b* of the support film 28 having the RFIC element 100 attached thereto.

Figure 4D:
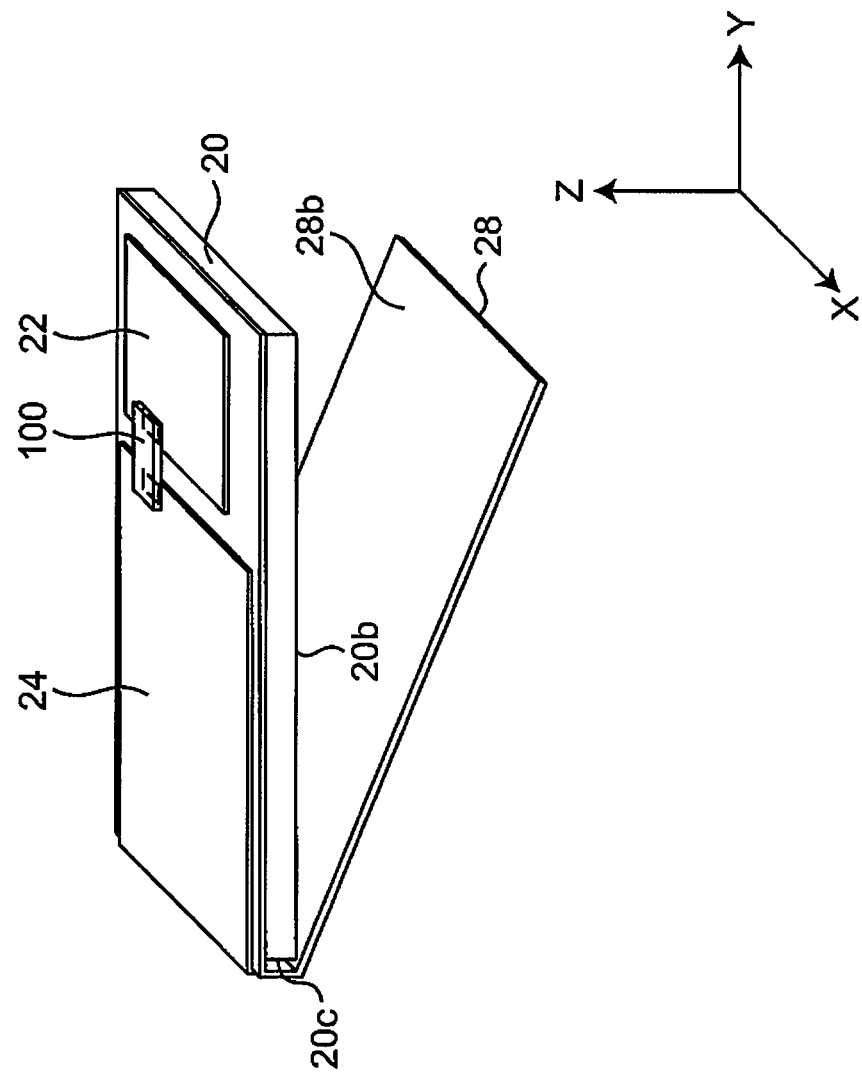
FIG. 4D is a view for explaining a fabrication step of the wireless communication module, following FIG. 4C.

As shown in FIG. 4D, the support film 28 is folded so as to affix a remaining portion of the back surface 28*b* of the support film 28 to the back surface 20*b* side of the dielectric substrate 20. As shown in FIG. 2, the wireless communication module 12 is completed.

According to the manufacturing method as shown in FIGS. 4A to 4D, the second radiation electrode 24 and the back surface electrode 26 can be made up of one metal film. Therefore, the electrodes can be formed by a simple method, and a high-frequency transmission loss is suppressed between the second radiation electrode 24 and the back surface electrode 26.

As shown in FIG. 3, the support film 28 is affixed from the back surface 20*b* over to the front surface 20*a* of the dielectric substrate 20 separately from an end surface 20*c* of the dielectric substrate 20 with a space therebetween in the length direction (Y-axis direction) of the wireless communication device 10. The reason is that if the support film 28 is affixed also to the end surface 20*c* of the support film 28, the support film 28 is possibly partially peeled off from at least one of the front surface 20*a* and the back surface 20*b* of the dielectric substrate 20 when the wireless communication device 10 (i.e., the dielectric substrate 20 of the wireless communication module 12) is bent. If a portion of the support film 28 is peeled off, a distance varies between the first/second radiation electrodes 22, 24 and the back surface electrode 26, thereby changing a stray capacitance therebetween. Consequently, the communication characteristics of the wireless communication module 12 may change, and the radiation efficiency of the radio waves from the first and second radiation electrodes 22, 24 may deteriorate.

Figure 5:
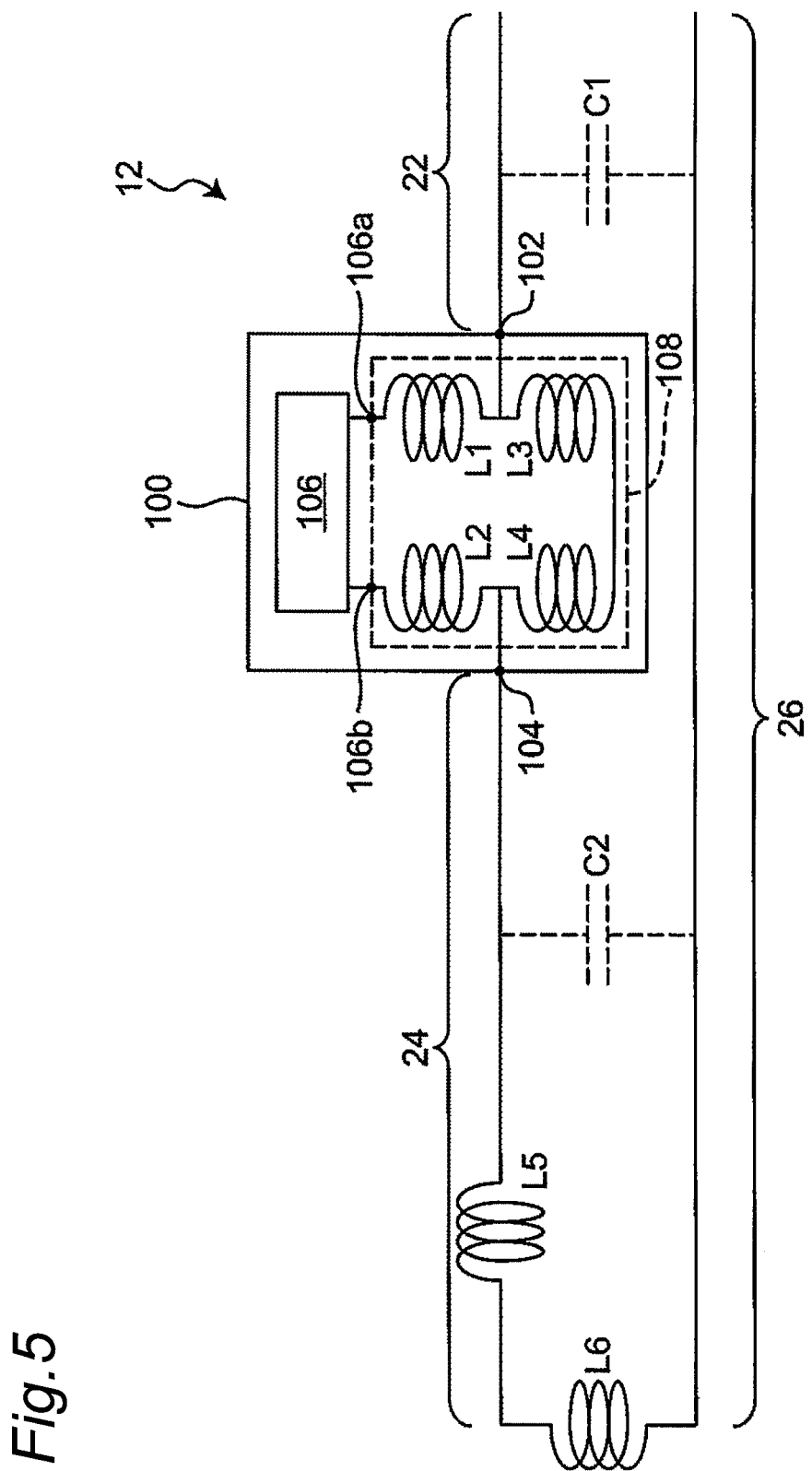
FIG. 5 is a diagram of an equivalent circuit of the wireless communication device.

FIG. 5 shows an equivalent circuit of the wireless communication device 10.

As shown in FIG. 5, a stray capacitance C1 exists between the first radiation electrode 22 and a portion of the back surface electrode 26 (the portion opposite to the first radiation electrode 22).

A stray capacitance C2 exists between the second radiation electrode 24 and a portion of the back surface electrode 26 (the portion opposite to the second radiation electrode 24). The stray capacitance C1, a parasitic inductor L5 of the second radiation electrode 24, and a parasitic inductor L6 of a connection portion between the second radiation electrode 24 and the back surface electrode 26 form a parallel resonance circuit having a predetermined frequency (e.g., 900 MHz) as the resonance frequency.

The stray capacitance C1 between the first radiation electrode 22 and the portion of the back surface electrode 26 opposite thereto is made smaller than the stray capacitance C2 between the second radiation electrode 24 and the portion of the back surface electrode 26 opposite thereto.

Figure 6:
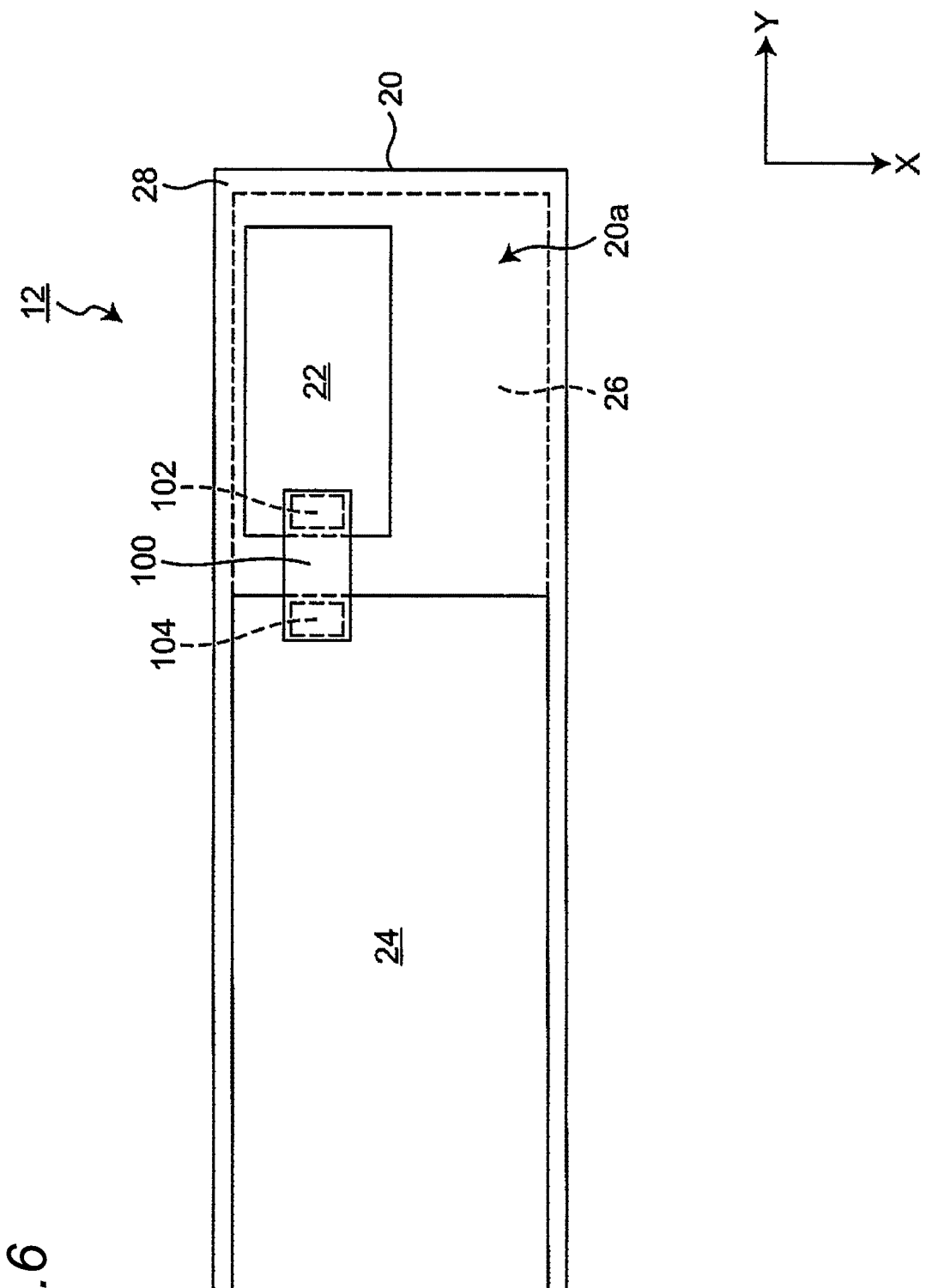
FIG. 6 is a top view of the wireless communication module.

Specifically, as is apparent from FIG. 6 that is a top view of the wireless communication module 12, the first radiation electrode 22 and the second radiation electrode 24 are independent of each other (separated at a distance in terms of shape). Although the first radiation electrode 22 and the second radiation electrode 24 are disposed in the same layer, the area of the portion of the back surface electrode 26 opposite to the first radiation electrode 22 is smaller than the area of the portion of the back surface electrode 26 opposite to the second radiation electrode 24. Consequently, the stray capacitance C1 between the first radiation electrode 22 and the portion of the back surface electrode 26 opposite thereto is smaller than the stray capacitance C2 between the second radiation electrode 24 and the portion of the back surface electrode 26 opposite thereto. The reason of making the stray capacitance C1 for the first radiation electrode 22 made smaller than the stray capacitance C2 for the second radiation electrode 24 will be described later.

The RFIC element 100 will be described.

The RFIC device 100 shown in FIG. 5 is an RFIC device using a communication frequency of, for example, the 900 MHz band, i.e., the UHF band. The RFIC device 100 has flexibility as described in detail later. The RFIC device 100 has an RFIC chip 106 and a matching circuit 108 for impedance matching between the RFIC chip 106 and the first and second radiation electrodes 22, 24.

The RFIC chip 106 includes first and second input/output terminals 106a, 106b. The first input/output terminal 106a is connected to the first radiation electrode 22 via the matching circuit 108. The second input/output terminal 106b is connected to the second radiation electrode 24 via the matching circuit 108.

When the first and second radiation electrodes 22, 24 acting as an antenna receive a high-frequency signal from the outside, the RFIC chip 106 is activated in response to a supply of a current induced by the reception. The activated RFIC chip 106 generates a high-frequency signal and outputs the generated signal as a radio wave through the first and second radiation electrodes 22, 24 to the outside.

A specific configuration of the RFIC element 100 will hereinafter be described.

Figure 7:
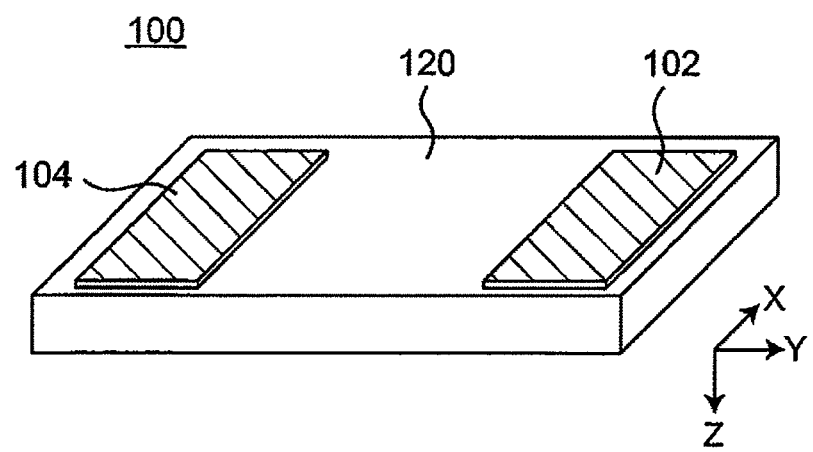
FIG. 7 is a perspective view of an RFIC element.

FIG. 7 is a perspective view of the RFIC element 100. In the case of this embodiment, the RFIC element 100 has a multilayer substrate 120 as an element substrate provided with the RFIC chip 106 and the matching circuit 108. The multilayer substrate 120 is formed by laminating multiple insulating layers having flexibility. For example, the multiple insulating layers are flexible resin insulating layers of polyimide or liquid crystal polymer.

Figure 8:
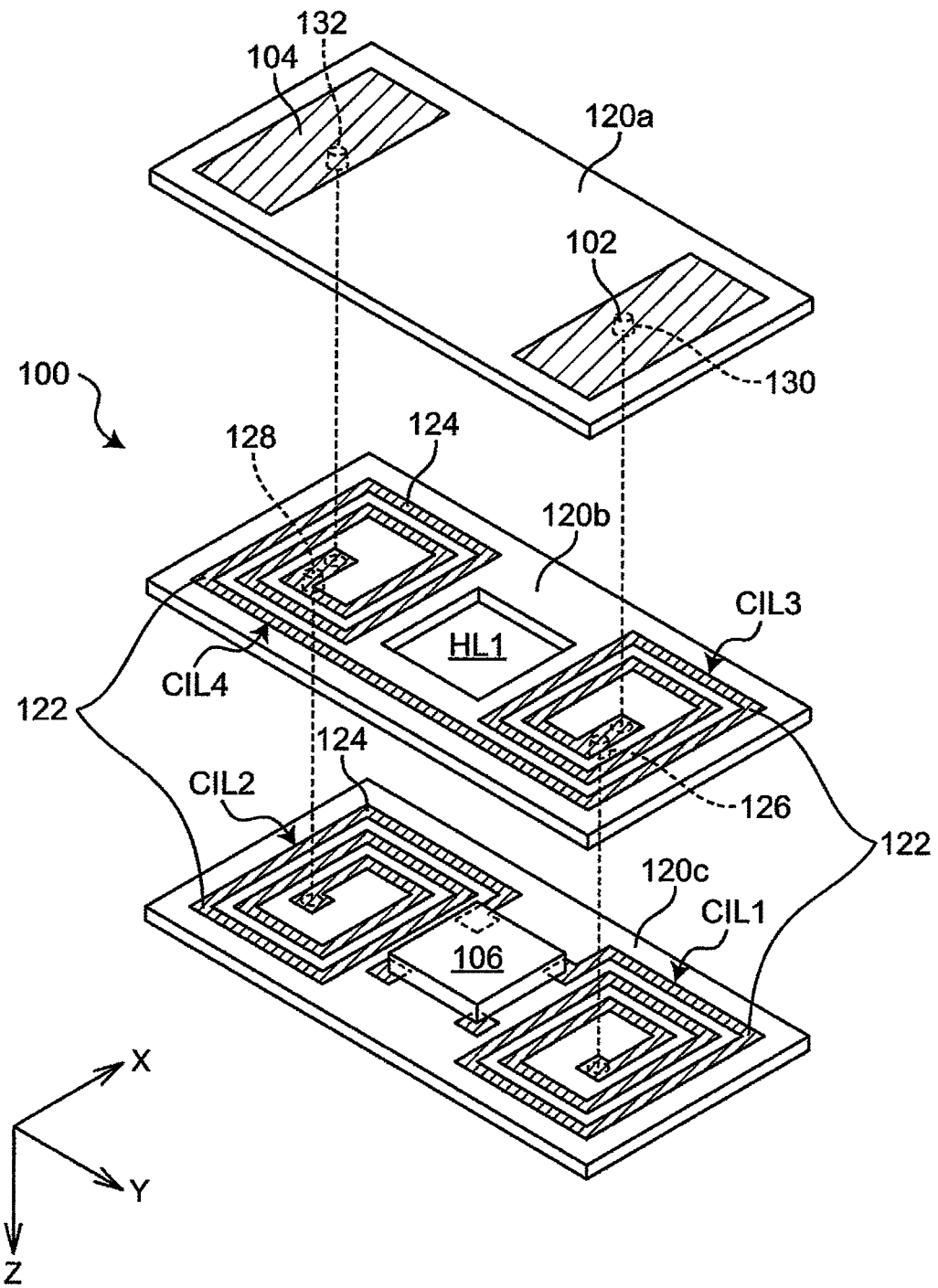
FIG. 8 is a perspective view of an internal structure of the RFIC element shown in FIG. 7.

FIG. 8 is a perspective view of an internal structure of the RFIC element shown in FIG. 7. In the following description, the side provided with the first and second terminal electrodes 102, 104, i.e., the side facing the dielectric substrate 20 in the wireless communication module 12, is assumed as the upper side of the RFIC element 100.

Figure 10A:
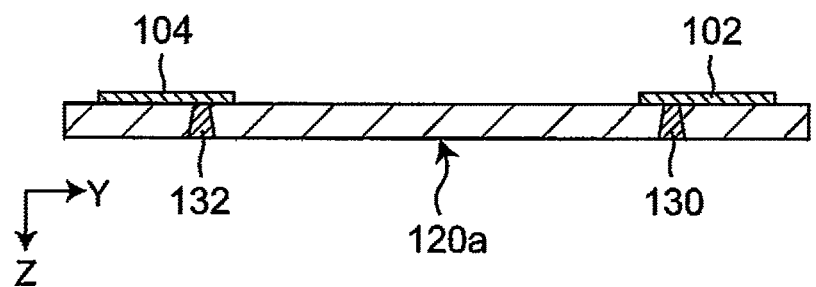
FIG. 10A is a cross-sectional view of the upper insulating layer taken along a line B1-B1 shown in FIG. 9A.
Figure 10B:
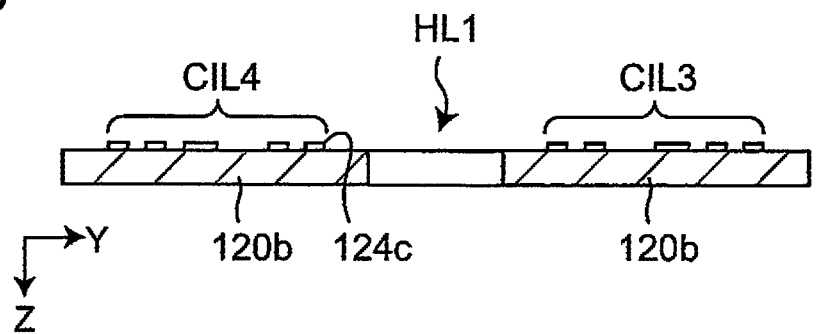
FIG. 10B is a cross-sectional view of the middle insulating layer taken along a line B2-B2 shown in FIG. 9B.
Figure 10C:
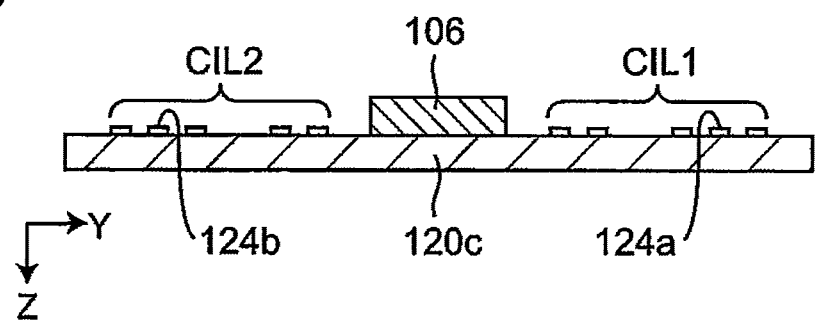
FIG. 10C is a cross-sectional view of the lower insulating layer taken along a line B3-B3 shown in FIG. 9C.

FIG. 9A is a top view of an upper insulating layer of the multilayer substrate 120. FIG. 9B is a top view of a middle insulating layer of the multilayer substrate 120. FIG. 9C is a top view of a lower insulating layer of the multilayer substrate 120. FIG. 10A is a cross-sectional view of the insulating layer taken along a line B1-B1 shown in FIG. 9A. FIG. 10B is a cross-sectional view of the insulating layer taken along a line B2-B2 shown in FIG. 9B. FIG. 10C is a cross-sectional view of the insulating layer taken along a line B3-B3 shown in FIG. 9C.

As shown in FIG. 8, the multilayer substrate 120 incorporates the RFIC chip 106 and a feeding circuit 122 acting as the matching circuit 108. The multilayer substrate 120 is provided with the first terminal electrode 102 and the second terminal electrode 104.

The RFIC chip 106 has a structure in which various elements are built in a semiconductor substrate made of a semiconductor such as silicon. As shown in FIG. 9C, the RFIC chip 106 is provided with the first input/output terminal 106a and the second input/output terminal 106b.

As shown in FIG. 8, the feeding circuit 122 is made up of a coil conductor 124 and interlayer connection conductors 126, 128. The coil conductor 124 is made up of coil patterns 124a to 124c shown in FIG. 9B or 9C. The coil pattern 124a constitutes a first coil part CIL1. The coil pattern 124b constitutes a second coil part CIL2. The coil pattern 124c constitutes a third coil part CIL3 and a fourth coil part CIL4.

The first coil part CIL1, the third coil part CIL3, and the interlayer connection conductor 126 are arranged in line in the thickness direction (Z-axis direction) at a position on one side in the length direction (Y-axis direction). The second coil part CIL2, the fourth coil part CIL4, and the interlayer connection conductor 128 are arranged in line in the thickness direction (Z-axis direction) at a position on the other side in the length direction (Y-axis direction).

When the multilayer substrate 120 is viewed in the height direction (Z-axis direction), the RFIC chip 106 is disposed between the first coil part CIL1 and the second coil part CIL2. The RFIC chip 106 is disposed also between the third coil part CIL3 and the fourth coil part CIL4.

The first terminal electrode 102 is disposed at a position on the one side in the length direction (Y-axis direction), and the second terminal electrode 104 is disposed at a position on the other side. The first and second terminal electrodes 102, 104 are made of copper foil having flexibility and are formed into a strip shape of the same size.

As shown in FIGS. 9A to 9C, the multilayer substrate 120 is made up of three laminated sheet-shaped insulating layers 120a to 120c. The insulating layer 120b is located between the upper insulating layer 120a and the lower insulating layer 120c.

The first terminal electrode 102 and the second terminal electrode 104 are formed on the insulating layer 120a.

A through-hole HL1 having a rectangular cross section is formed at the center of the insulating layer 120b. The through-hole HL1 is formed into a size accommodating the RFIC chip 106. The belt-like coil pattern 124c is formed around the through-hole HL1 of the insulating layer 120b. The coil pattern 124c is made of flexible copper foil.

One end portion of the coil pattern 124c overlaps with the first terminal electrode 102 when viewed in the thickness direction (viewed in the Z-axis direction), and is connected to the first terminal electrode 102 by an interlayer connection conductor 130 extending in the thickness direction (Z-axis direction). The other end portion of the coil pattern 124c overlaps with the second terminal electrode 104 when viewed in the thickness direction, and is connected to the second terminal electrode 104 by an interlayer connection conductor 132 extending in the thickness direction. The interlayer connection conductors 130, 132 are made up of metal bulks containing Sn as a main component.

The coil pattern 124c goes round the one end portion twice in the counterclockwise direction and subsequently bends to extend in the length direction (Y-axis direction). The coil pattern 124c extending in the length direction (Y-axis direction) bends in the width direction (X-axis direction) and goes round the other end portion twice in the counterclockwise direction before reaching the other end portion.

The belt-like coil patterns 124a, 124b are formed on the insulating layer 120c. The coil patterns 124a, 124b are made of flexible copper foil.

An outer end portion (a first coil end T1) of the coil pattern 124a is disposed at a position overlapping with one corner portion of the rectangular through-hole HL1. An outer end portion (a second coil end T2) of the coil pattern 124b is disposed at a position overlapping with a corner portion arranged in the length direction (Y-axis direction) with respect to the corner portion at which the first coil end T1 is disposed out of the four corner portions of the rectangular through-hole HL1.

Assuming an end portion on the center side of the coil pattern 124a as a starting point, the coil pattern 124a goes around the center end portion 2.5 times in the clockwise direction and subsequently bends in the width direction (X-axis direction) to reach the other end (the first coil end T1) according to the exemplary aspect. Similarly, assuming an end portion on the center side of the coil pattern 124b as a starting point, the coil pattern 124b goes round the center end portion 2.5 times in the counterclockwise direction and subsequently bends in the width direction (X-axis direction) to reach the other end (the second coil end T2) according to the exemplary aspect. The center end portion of the coil pattern 124a is connected to the one end portion of the coil pattern 124c by the interlayer connection conductor 126 extending in the thickness direction (Z-axis direction). The center end portion of the coil pattern 124b is connected to the other end portion of the coil pattern 124c by the interlayer connection conductor 128 extending in the thickness direction. Preferably, the interlayer connection conductors 126, 128 are made up of metal bulks containing Sn as a main component.

The position of the center end portion of the coil pattern 124a or the one end portion of the coil pattern 124c is defined as a "first position P1", and the position of the center end portion of the coil pattern 124b or the other end portion of the coil pattern 124c is defined as a "second position P2".

In the exemplary aspect, dummy conductors 134, 136 are formed on the insulating layer 120c. The dummy conductors 134, 136 are made of flexible copper foil. When the insulating layers 120b, 120c are viewed in the thickness direction (viewed in the Z-axis direction), the dummy conductors 134, 136 are disposed to overlap with respective corner portions opposite in the width direction (X-axis direction) to the corner portions at which the first and second coil ends T1, T2 are disposed, out of the four corner portions of the rectangular through-hole HL1.

The RFIC chip 106 is mounted on the insulating layer 120c such that the four corner portions thereof respectively face the first coil end T1, the second coil end T2, and the dummy conductors 134, 136. The first input/output terminal 106a is connected to the first coil end T1, and the second input/output terminal 106b is connected to the second coil end T2.

In an exemplary aspect, the thickness of the insulating layers 120a to 120c is 10 µm or more and 100 µm or less. Therefore, the RFIC chip 106 and the feeding circuit 122 built in the multilayer board 120 are seen through from the outside. Thus, the connection state (presence/absence of breaking) of the RFIC chip 106 and the feeding circuit 122 can easily be confirmed.

In the RFIC device 100 shown by the equivalent circuit in FIG. 5, an inductor L1 corresponds to the first coil part CIL1. An inductor L2 corresponds to the second coil part CIL2. An inductor L3 corresponds to the third coil part CIL3. An inductor L4 corresponds to the fourth coil part CIL4. The characteristics of impedance matching by the feeding circuit 122 are defined by the values of the inductors L1 to L4.

One end portion of the inductor L1 is connected to the first input/output terminal 106a of the RFIC chip 106. One end portion of the inductor L2 is connected to the second input/output terminal 106b of the RFIC chip 106. The other end portion of the inductor L1 is connected to one end portion of the inductor L3. The other end portion of the inductor L2 is connected to one end portion of the inductor L4. The other end portion of the inductor L3 is connected to the other end portion of the inductor L4. The first terminal electrode 102 is connected to a connection point of the inductors L1, L3. The second terminal electrode 104 is connected to a connection point of the inductors L2, L4.

As can be seen from the equivalent circuit shown in FIG. 5, the first coil part CIL1, the second coil part CIL2, the third coil part CIL3, and the fourth coil part CIL4 are wound to generate magnetic fields in phase and are connected in series to each other. Therefore, the magnetic fields generated from these coil parts CIL1 to CIL4 are oriented in the same direction.

As can be seen from FIGS. 9B and 9C, the first coil part CIL1 and the third coil part CIL3 have substantially the same loop shape and the same first winding axis. Similarly, the second coil part CIL2 and the fourth coil part CIL4 have substantially the same loop shape and the same second winding axis. The first winding axis and the second winding axis are arranged at positions sandwiching the RFIC chip 106.

Therefore, the first coil part CIL1 and the third coil part CIL3 are magnetically and capacitively coupled. Similarly, the second coil part CIL2 and the fourth coil part CIL4 are magnetically and capacitively coupled.

The RFIC chip 106 is made up of a semiconductor substrate. As a result, the RFIC chip 106 functions as a ground or a shield for the first coil part CIL1, the second coil part CIL2, the third coil part CIL3, and the fourth coil part CIL4. Consequently, it is difficult for the first coil part CIL1 and the second coil part CIL2 as well as the third coil part CIL3 and the fourth coil part CIL4 to magnetically and capacitively couple each other. This can reduce the concern that a passband of a communication signal becomes narrower.

As described above, according to the configuration described above, the wireless communication device 10 can communicate even when attached to a metal surface of an article, and has a higher communication capability, i.e., can radiate radio waves with higher radiation efficiency. This will specifically be described.

As described above and as shown in FIG. 5, the matching circuit 108 of the RFIC element 100 achieves the impedance matching between the first and second radiation electrodes 22, 24 and the RFIC chip 106 of the RFIC element 100. Additionally, a resonance circuit is formed by the parasitic inductor L5 of the second radiation electrode 24, the parasitic inductances L6 of the connection portion between the second radiation electrode 24 and the back surface electrode 26, and the stray capacitance C2 between the second radiation electrode 24 and the back surface electrode 26 opposite thereto. Therefore, the wireless communication device 10 has favorable communication characteristics at, for example, a frequency of the UHF band (e.g., 900 MHz).

As shown in FIG. 1, the wireless communication device 10 is attached to an article via the attachment part 14a of the protective case 14. Therefore, the back surface electrode 26 is capacitively coupled to the article and is thereby grounded.

Figure 11:
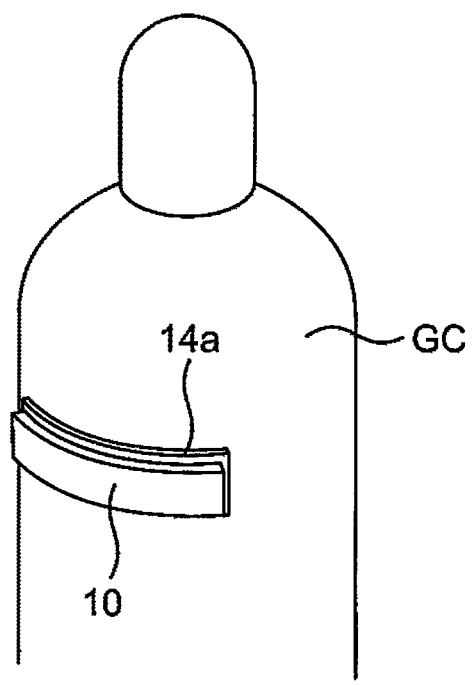
FIG. 11 is a diagram of the wireless communication device attached to an article.

The wireless communication device 10 with such a configuration has communication characteristics unchanged even if the article at least partially has a metal surface and the back surface electrode 26 is capacitively coupled to the metal surface. For example, as shown in FIG. 11, even when the wireless communication device 10 is affixed via the attachment part 14a (the seal member 16 on the back thereof) to a surface (metal surface) of a gas cylinder GC made of a metal material so that the surface of the gas cylinder GC and the back surface electrode 26 are capacitively coupled, the communication characteristics of the wireless communication device 10 do not change. Therefore, even when attached to the metal surface of the article, the wireless communication device 10 can perform wireless communication with high radiation efficiency in the same way as if the device 10 is not attached to the article. In one aspect, it is contemplated that the wireless communication device 10 attached to the metal surface of the article (i.e., the article equipped with the wireless communication device 10) can perform long-distance wireless communication by using the metal surface as an antenna.

For the grounded back surface electrode 26, the first radiation electrode 22 is disposed at a distant position as compared to the second radiation electrode 24 in terms of a current path. Therefore, the radio waves radiated from the wireless communication device 10 are mainly radiated from the first radiation electrode 22.

As shown in FIG. 6, the first radiation electrode 22 and the second radiation electrode 24 are independent of each other (i.e., separated at a distance in terms of shape). Therefore, as shown in FIG. 5, the stray capacitance C1 is generated between the first radiation electrode 22 and the portion of the back surface electrode 26 opposite thereto, and the stray capacitance C2 is generated between the second radiation electrode 24 and the portion of the back surface electrode 26 opposite thereto.

As explained above, the stray capacitance C1 for the first radiation electrode 22 is smaller than the stray capacitance C2 for the second radiation electrode 24. In other words, as shown in FIG. 6, the area of the portion of the back surface electrode 26 opposite to the first radiation electrode 22 is smaller than the area of the portion of the back surface electrode 26 opposite to the second radiation electrode 24. Therefore, the radiation efficiency of the radio waves from the first radiation electrode 22 is higher than the radiation efficiency of the radio waves from the second radiation electrode 24.

Specifically, an electric power supplied from the RFIC element 100 to a radiation electrode is partially used for radiation of radio waves, and the remainder is used for electric field formation and heat generation in a stray capacitance between the radiation electrode and the back surface electrode. When the stray capacitance is larger, a larger amount of the electric power is used for the electric field formation. Therefore, in the first radiation electrode 22 having the smaller stray capacitance, a larger proportion of the supplied electric power is used for the radiation of radio waves. Therefore, the first radiation electrode 22 has higher radiation efficiency.

In other words, by dividing the radiation electrode into the first radiation electrode 22 and the second radiation electrode 24 made independent of each other (separated at a distance in terms of shape) and making the stray capacitance C1 for the first radiation electrode 22 smaller than the stray capacitance C2 for the second radiation electrode 24, the first radiation electrode 22 is provided as a local portion in which the radiation of the radio waves is facilitated in the entire radiation electrode. Therefore, more radio waves are radiated by the first radiation electrode 22 mainly radiating the radio waves in the wireless communication device 10 since is positioned at a distant from the grounded back surface electrode 26.

Thus, as compared to a design in which the radiation electrode is not divided into the first radiation electrode 22 and the second radiation electrode 24, the wireless communication device 10 can radiate radio waves with higher radiation efficiency. Consequently, the wireless communication device 10 is capable of wirelessly communicated even when attached to the metal surface of the article and has a higher communication capability.

To provide the wireless communication device 10 with the higher communication capability, in the case of this embodiment, as shown in FIG. 6, the first radiation electrode 22 extending in the direction away from the RFIC element 100 has a width (size in the X-axis direction) smaller than that of the second radiation electrode 24. Therefore, the first radiation electrode 22 with higher radiation efficiency can radiate radio waves with strong radio field intensity as compared to the second radiation electrode 24.

In the case of this embodiment, the wireless communication device 10 has flexibility. In other words, the constituent elements of the wireless communication device 10, i.e., the protective case 14, the dielectric substrate 20, the first radiation electrode 22, the second radiation electrode 24, the back surface electrode 26, and the RFIC element 100 (the multilayer substrate 120 therein etc.), are made of flexible materials. Therefore, the wireless communication device 10 can be attached not only to a flat surface but also to a curved surface. For example, as shown in FIG. 11, the device can be attached to the curved surface of the gas cylinder GC. Therefore, close contact can be achieved even when the device is attached to a flat surface or a curved surface, and the high-frequency transmission characteristics between the article and the wireless communication device 10 are not changed. Therefore, the wireless communication device 10 can implement the high communication capability without being affected by a shape of the article to which the device is attached.

According to this embodiment, the wireless communication device 10 is capable of wireless communication even when attached to the metal surface of the article and can radiate radio waves with higher radiation efficiency.

Although the wireless communication device 10 has been described with the above exemplary embodiment, alternative embodiments are not limited thereto.

For example, in the case of the embodiment described above, as shown in FIG. 5, the RFIC element 100 has the RFIC chip 106 and the matching circuit 108 achieving impedance matching between the RFIC chip 106 and the first and second radiation electrodes 22, 24. However, the exemplary embodiments are not limited thereto. The matching circuit 108 may not be included as long as the impedance matching can be achieved between the RFIC chip 106 and the first and second radiation electrodes 22, 24 by the impedance of the RFIC chip 106 itself. In this case, the RFIC chip 106 itself constitutes the RFIC element 100.

In the case of the embodiment described above, as shown in FIG. 6, the first radiation electrode 22 has a rectangular shape. However, the shape of the first radiation electrode in exemplary embodiments of the present disclosure is not limited to a rectangular shape.

Figure 12:
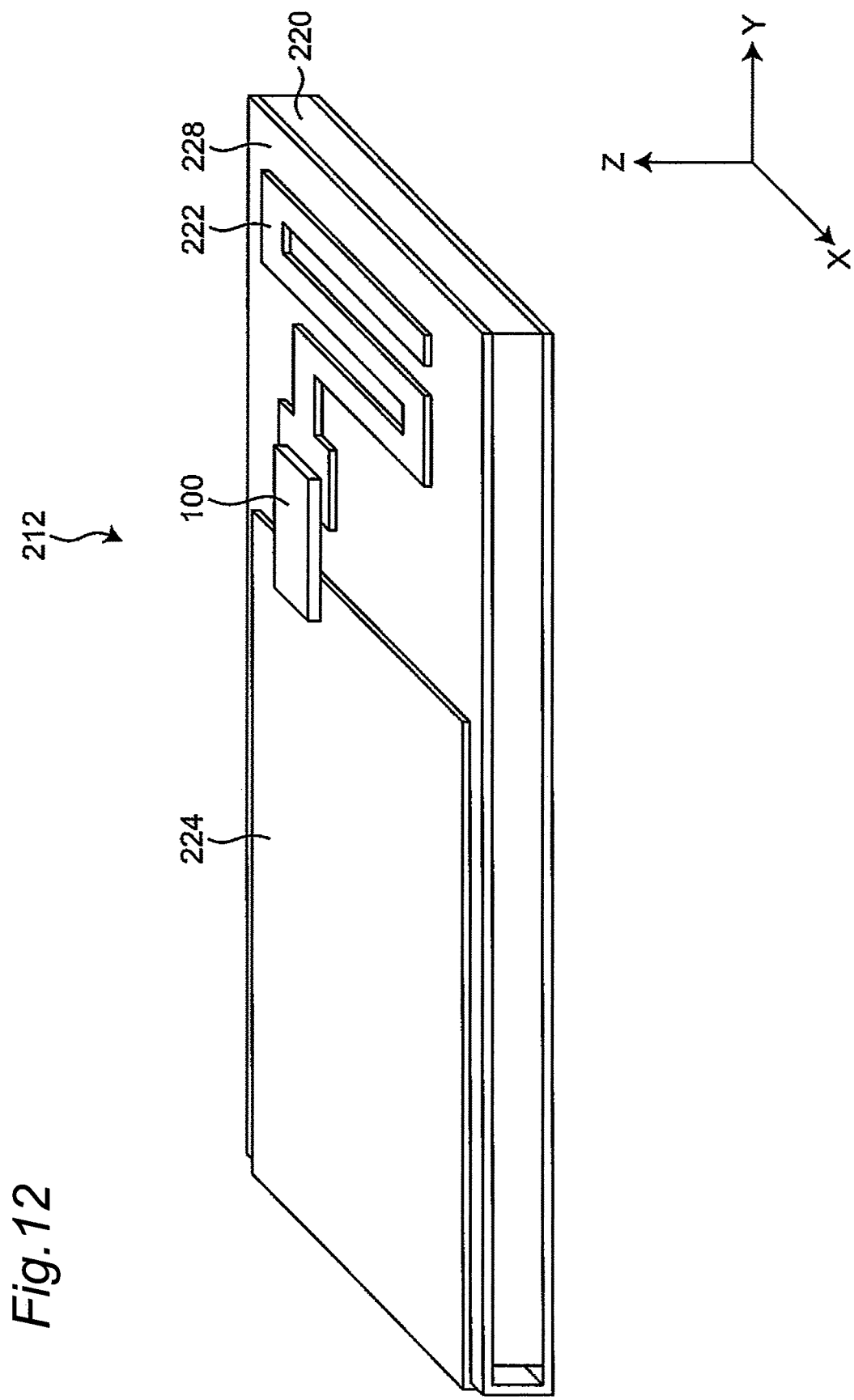
FIG. 12 is a perspective view of a wireless communication module of a wireless communication device according to another exemplary embodiment.

For example, as shown in FIG. 12, a wireless communication module 212 of a wireless communication device according to another embodiment has a first radiation electrode 222 in a meandering shape extending in a direction (length direction (Y-axis direction) of the wireless communication device) away from the RFIC element 100 while meandering. This first radiation electrode 222 in a meandering shape has a width smaller than that of the second radiation electrode 224 and extends while meandering. Therefore, as compared to the second radiation electrode 224, the first radiation electrode 222 can radiate radio waves with strong radio field intensity.

Figure 13:
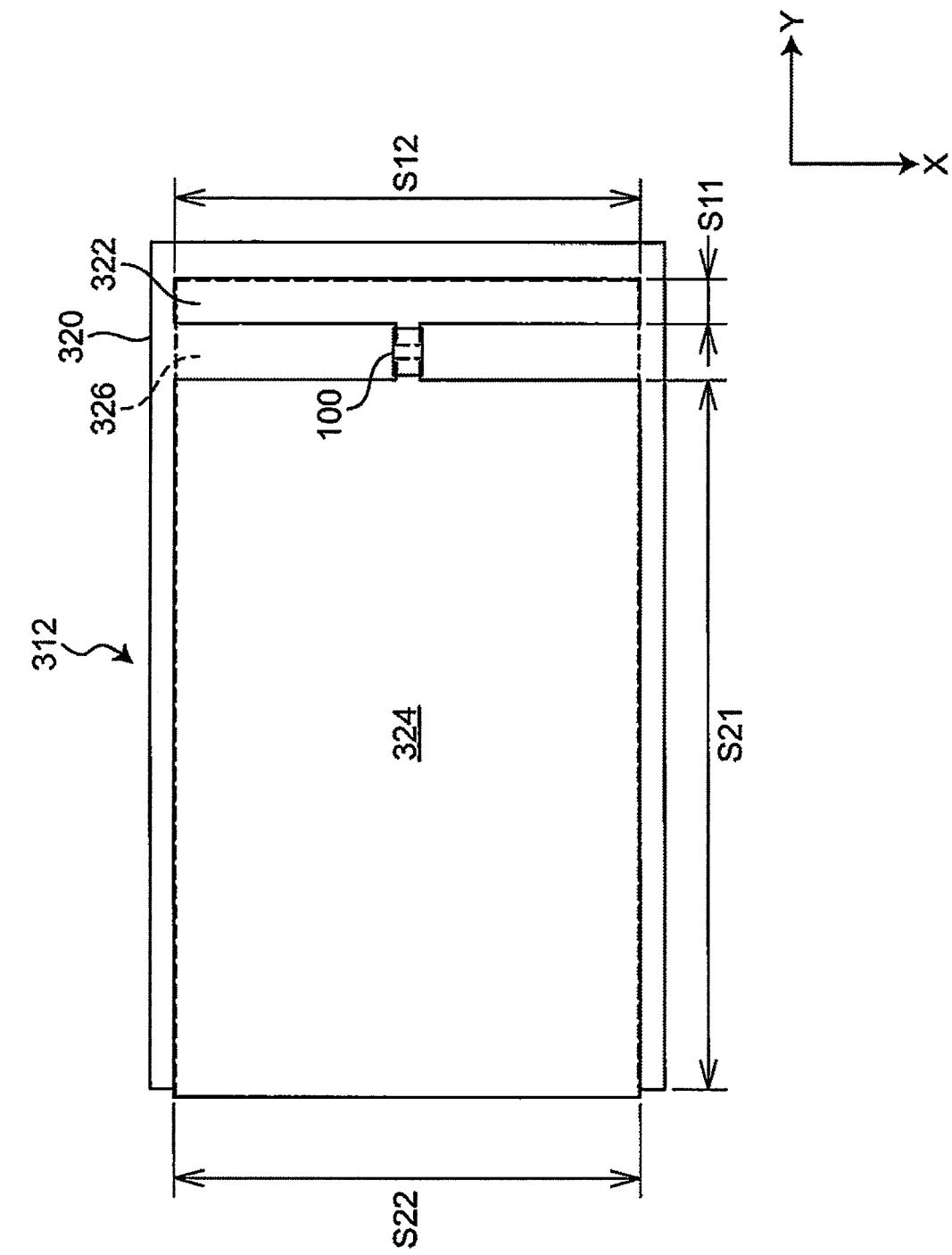
FIG. 13 is a top view of a wireless communication module of a wireless communication device according to yet another exemplary embodiment.
Figure 14:
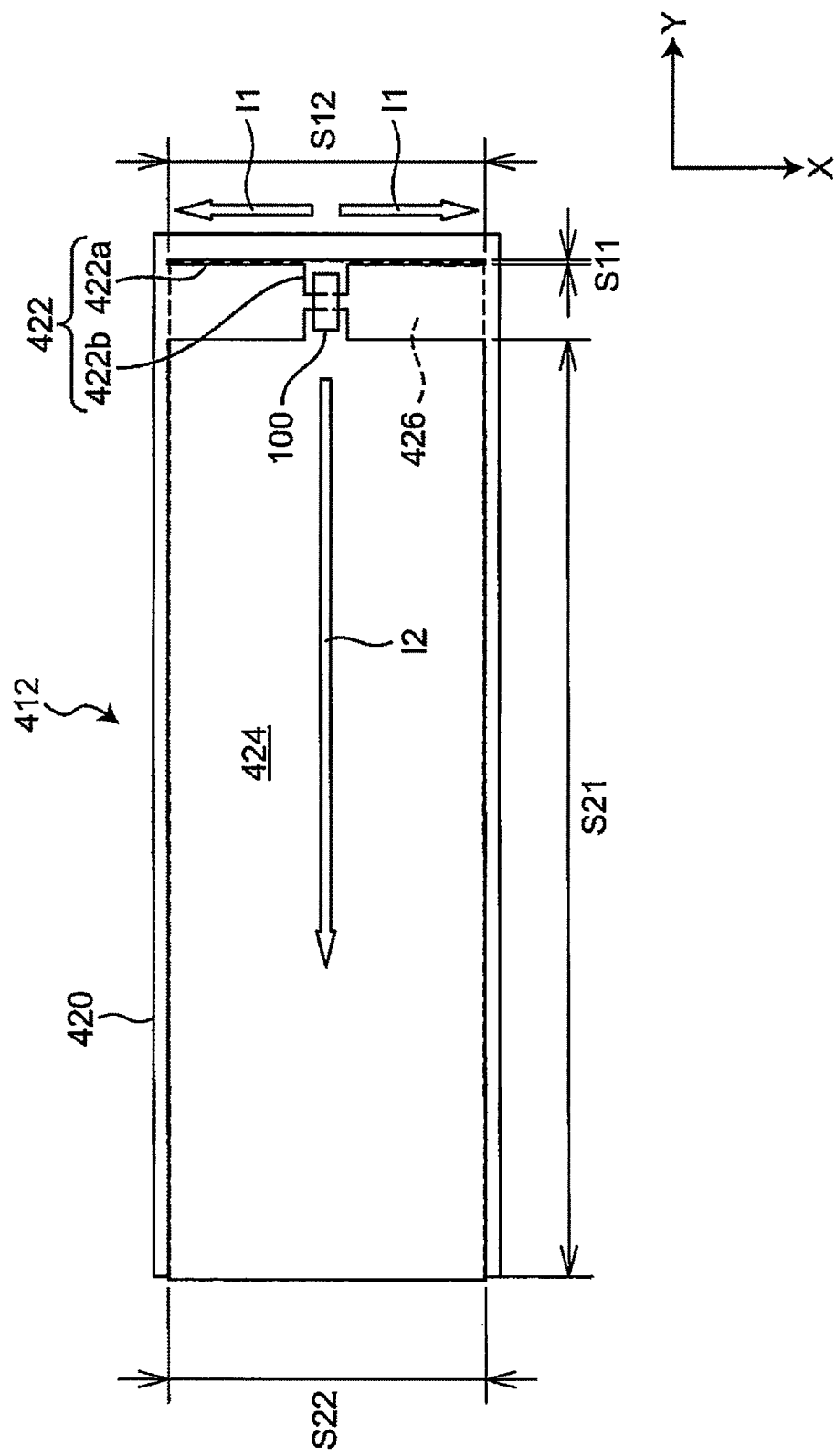
FIG. 14 is a top view of a modification example of the wireless communication module shown in FIG. 13.
Figure 15:
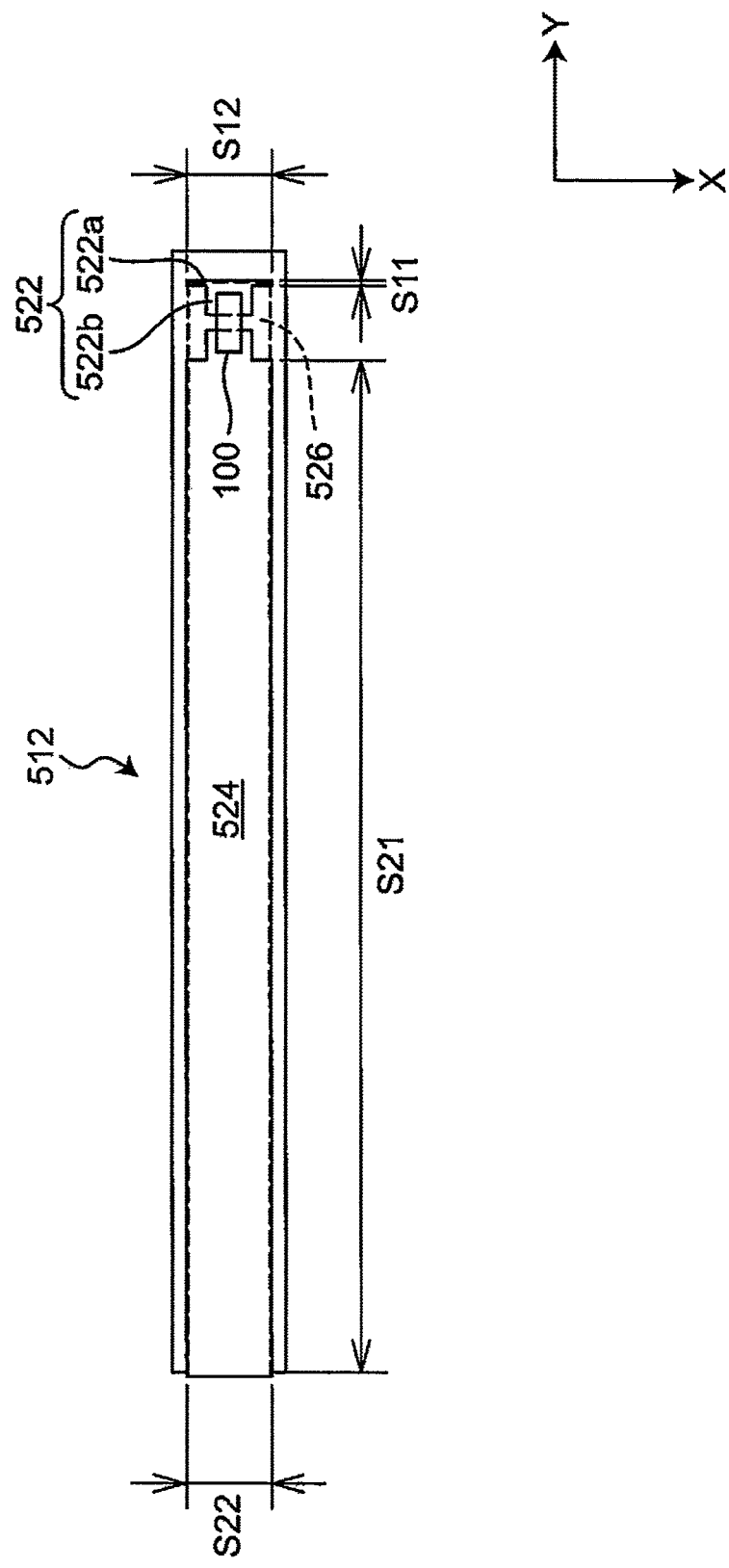
FIG. 15 is a top view of a further modification example of the wireless communication module shown in FIG. 13.

For example, wireless communication modules 312 to 512 of a wireless communication device according to yet another embodiment shown in FIGS. 13 to 15 have "T"-shaped first radiation electrodes 322 to 522. For example, describing with reference to FIG. 13, this "T"-shaped first radiation electrode 322 extends from the RFIC element 100 toward both side ends of the dielectric substrate 320 in the width direction (X-axis direction) of the wireless communication device. In this case, since the first radiation electrode 322 extends in the width direction (X-axis direction) instead of the length direction (Y-axis direction) of the wireless communication device, the size of the dielectric substrate 320 in the length direction, i.e., the size of the wireless communication module 312 in the length direction, can be made smaller.

In the case of the "T"-shaped first radiation electrodes 322 to 522 as shown in FIGS. 13 to 15, specifically, if the length of the first radiation electrode (the size in the length direction (Y-axis direction) of the wireless communication device) is smaller than the width (the size in the width direction (X-axis direction) of the wireless communication device), the communication distance of the wireless communication device can be made longer as compared to the other cases.

This design will specifically be described with reference to a wireless communication module 412 of a wireless communication device shown in FIG. 14. First, in a first radiation electrode 422 of the wireless communication module 412 (specifically, a linear portion 422a except a land portion 422b connected to the RFIC element 100), a size S11 of the wireless communication device in the length direction (Y-axis direction) is smaller than a size S12 in the width direction (X-axis direction). In other words, the size S11 of the first radiation electrode 422 in the facing direction of the first radiation electrode 422 and a second radiation electrode 424 is smaller than the size S12 in the direction orthogonal to the facing direction.

In a portion on the opposite side in the length direction (Y-axis direction) with respect to the portion of the second radiation electrode 424 facing the first radiation electrode 422 on a front surface of a dielectric substrate 420, the second radiation electrode 424 is connected to a back surface electrode 426. Specifically, one belt-shaped metal film is folded back at an end of the dielectric substrate 420 on the far side in the length direction (Y-axis direction) of the wireless communication device with respect to the first radiation electrode 422, so that the second radiation electrode 424 and the back surface electrode 426 are provided.

According to the first radiation electrode 422 and the second radiation electrode 424 as described above, as shown in FIG. 14, a direction of a current I1 flowing through the first radiation electrode 422 and a direction of a current I2 flowing through the second radiation electrode 424 substantially differ by 90 degrees.

Specifically, since the size S11 of the first radiation electrode 422 in the length direction (Y-axis direction) of the wireless communication device is smaller than the size S12 in the width direction (X-axis direction), the first radiation electrode 422 has the current I1 flowing mainly in the width direction (X-axis direction).

On the other hand, the second radiation electrode 424 has the current I2 flowing from the portion facing the first radiation electrode 422 to the portion on the opposite side (i.e., the back surface electrode 426), and therefore, the flow direction of the current I2 is mainly in the length direction (Y-axis direction) of the wireless communication device.

If the direction of the current I1 flowing through the first radiation electrode 422 and the direction of the current I2 flowing through the second radiation electrode 424 substantially differ by 90 degrees in this way, the wireless communication device has a long communication distance. This is confirmed by the inventor through testing.

Table 1 shows shape features of Samples A to G of multiple wireless communication modules tested by the inventor and the test result, i.e., maximum communication distance d.

TABLE 1

| | | sample | | | | | | |
|---|---|---|---|---|---|---|---|---|
| | | A | B | C | D | E | F | G |
| first radiation electrode | length S11 (mm) | 0.5 | 0.5 | 0.5 | 10 | 0.5 | 0.5 | 0.5 |
| | width S12 (mm) | 40 | 17 | 4 | 40 | 7 | 4 | 4 |
| | bending length S13 (mm) | — | — | — | — | 2 | 2 | 2 |
| second radiation electrode | length S21 (mm) | 67 | 67 | 64 | 67 | 64 | 63 | 67 |
| | width S22 (mm) | 40 | 17 | 4 | 40 | 7 | 4 | 4 |
| dielectric substrate thickness t (mm) | | 2 | 2 | 2 | 2 | 2 | 2 | 5 |
| maximum communication distance d (m) | | 9.3 | 7.0 | 4.1 | 5.0 | 5.8 | 5.0 | 7.0 |

Figure 16:
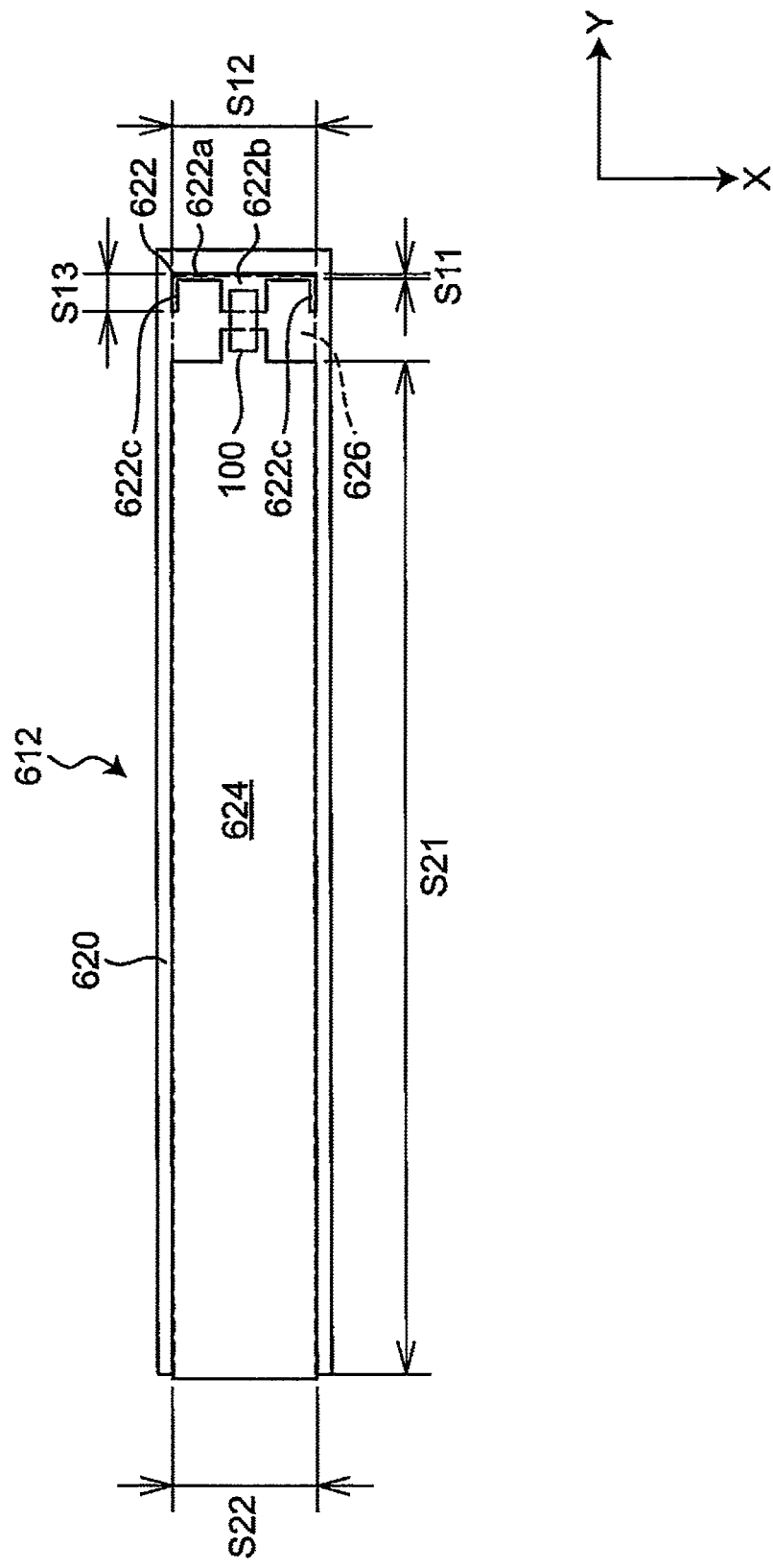
FIG. 16 is a top view of a wireless communication module of a wireless communication device according to yet another exemplary embodiment.

Samples A to D correspond to a wireless communication module with the first radiation electrode 422 having a "T" shape as shown in FIG. 14. On the other hand, Samples E to G correspond to a wireless communication module 612 with a first radiation electrode 622 having an "E" shape as shown in FIG. 16. Specifically, as shown in FIG. 16, the first radiation electrode 622 having an "E" shape includes a bending portion 622c extending in the length direction (Y-axis direction) from each of both ends (a tip of a linear portion 622a) of the first radiation electrode 622 in the width direction (X-axis direction) of the wireless communication device.

The electrodes of Samples A to G of these wireless communication modules are fabricated from aluminum films. The dielectric substrates are fabricated from a porous EVA resin having the permittivity of 2.8. The measurement of the communication distance was performed with the back surface electrode of each of Samples A to G disposed at the center of a 15 cm×15 cm piece of aluminum foil.

Referring to Samples A to C of the wireless communication module 412 including the first radiation electrode 422 having a "T" shape as shown in FIG. 14, these samples have substantially the same shape except the width (size in the width direction (X-axis direction) of the wireless communication device) S12 (40, 17, 4 mm) of the first radiation electrode 422 and the width S22 (40, 17, 4 mm) of the second radiation electrode 424.

Referring to Samples E, F of the wireless communication module 612 including the first radiation electrode 622 having an "E" shape as shown in FIG. 16, these samples have substantially the same shape except the width (size in the width direction (X-axis direction) of the wireless communication device) S12 (7, 4 mm) of the first radiation electrode 622 and the width S22 (7, 4 mm) of a second radiation electrode 624.

From the measurement result of the maximum communication distance d of each of Samples A to C, it can be seen that the maximum communication distance d is longer when the width S12 of the first radiation electrode 422 is larger. Similarly, from the measurement results of the maximum communication distance d of Samples E and F, it can be seen that the maximum communication distance d is longer when the width S12 of the first radiation electrode 622 is larger. Therefore, it is understood that the communication distance is extended as the width of the first radiation electrode becomes larger.

Referring to Samples A and D, these samples have substantially the same shape except the length (size in the length direction (Y-axis direction) of the wireless communication device) S11 (0.5, 10 mm) of the first radiation electrode 422 and the length S21 (0.5, 10 mm) of the second radiation electrode 424.

From the measurement result of the maximum communication distance d of each of Samples A and D, it can be seen that the maximum communication distance d is longer when the length S11 of the first radiation electrode 422 is smaller. Therefore, it is understood that the communication distance is extended as the length of the first radiation electrode becomes smaller.

In view of these results, when a longer communication distance is desired for the wireless communication module, as shown in FIG. 14, the first radiation electrode 422 preferably has the larger width S12 and preferably has the smaller length S11.

As the width S12 of the first radiation electrode 422 becomes larger, more radio waves are radiated from the first radiation electrode 422 (radio waves are radiated with higher radio field intensity), and the communication distance is made longer.

As the length S11 of the first radiation electrode 422 becomes smaller, the flow direction of the current I1 is more regulated such that the direction differs by 90 degrees from the direction of the current I2 flowing through the second radiation electrode 424, and the communication distance is made longer.

However, since a wireless communication device desirably has a smaller size, an increase in the width S12 of the first radiation electrode 422 is limited. Therefore, based on the length S21 of the second radiation electrode 424, the length S11 of the first radiation electrode 422 is made smaller than the length S21 of the second radiation electrode 424, preferably made smaller than $1/50$, more preferably made smaller than $1/100$, of the length S21 of the radiation electrode 424. As a result, the flow direction of the current I1 flowing through the first radiation electrode 422 more reliably differs by 90 degrees from the direction of the current I2 flowing through the second radiation electrode 424. From the opposite point of view, if the length S21 of the second radiation electrode 424 is larger (preferably by a factor of 50 or more, more preferably by a factor of 100) than the length S11 of the first radiation electrode 422, the flow direction of the current I2 flowing through the second radiation electrode 424 more reliably differs by 90 degrees from the flow direction of the current I1 of the first radiation electrode 422.

This is apparent from the test results. For example, in the case of Sample A having the maximum communication distanced of 9.3 m, the length S11 (0.5 mm) of the first radiation electrode 422 is $1/134$ of the length S21 (67 mm) of the second radiation electrode 424. On the other hand, in the case of Sample D having the maximum communication distance d of 5.0 m, which is shorter than Sample A, the length S11 (10 mm) of the first radiation electrode 422 is larger than $1/50$ of the length S21 (67 mm) of the second radiation electrode 424.

In addition to the relationship between the length S11 of the first radiation electrode 422 and the communication distance, the following is understood from the measurement results of the communication distance of Samples A to G of the wireless communication modules shown in Table 1.

For example, Samples F and G of the wireless communication module shown in Table 1 correspond to the wireless communication module 612 including the first radiation electrode 622 having an "E" shape as shown in FIG. 16 and have substantially the same shape except the thickness t of the dielectric substrate 620. According to Samples F and G, it can be seen that the maximum communication distance d is extended as the thickness t of the dielectric substrate 620 becomes larger. This is because, as the thickness t of the dielectric substrate 620 becomes larger, the stray capacitance between the first radiation electrode 622 and the back surface electrode 626 becomes smaller and the radiation efficiency of radio waves from the first radiation electrode 622 is thereby increased.

Samples C and F of the wireless communication module shown in Table 1 have substantially the same shape except that the sample F includes the bending portions 622c as shown in FIG. 16. The sample F including the bending portions 622c has the longer maximum communication distance d as compared to the sample C without a bending portion. This is because the first radiation electrode is larger since the bending portions are included, and is therefore capable of radiating more radio waves (radio waves with higher radio field intensity). In this way, when the first radiation electrode includes the bending portions extending in the length direction (Y-axis direction) of the wireless communication device, a long communication distance can be achieved even if the size in the width direction (X-axis direction) of the wireless communication device is limited.

It is noted that a method of implementing a long communication distance under limitation of the size in the width direction (X-axis direction) of the wireless communication device can be a method other than disposing the bending portion 622c extending in the length direction (Y-axis direction) at each of both ends of the first radiation electrode 622 in the width direction.

Figure 17:
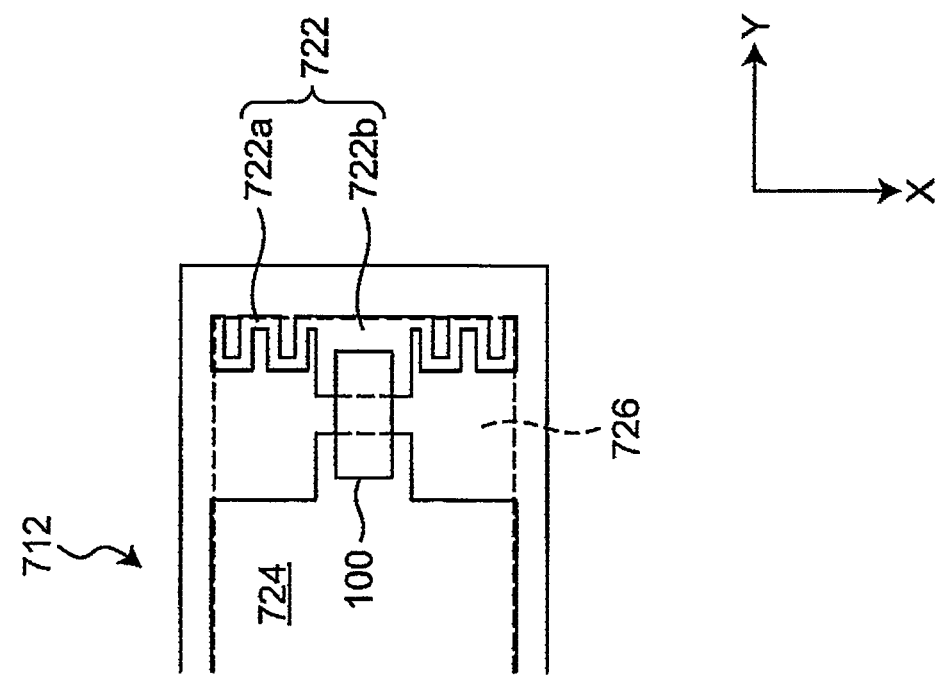
FIG. 17 is a partial top view of a wireless communication module of a wireless communication device according to yet another exemplary embodiment.

For example, a wireless communication module 712 according to an exemplary embodiment shown in FIG. 17 includes a meander portion 722a meandering while extending in the width direction (X-axis direction) of the wireless communication device from a land portion 722b connected to the RFIC element 100. By including the meander portion 722a in the first radiation electrode 722, a long communication distance can be implemented when the size in the width direction (X-axis direction) of the wireless communication device is limited.

Figure 18:
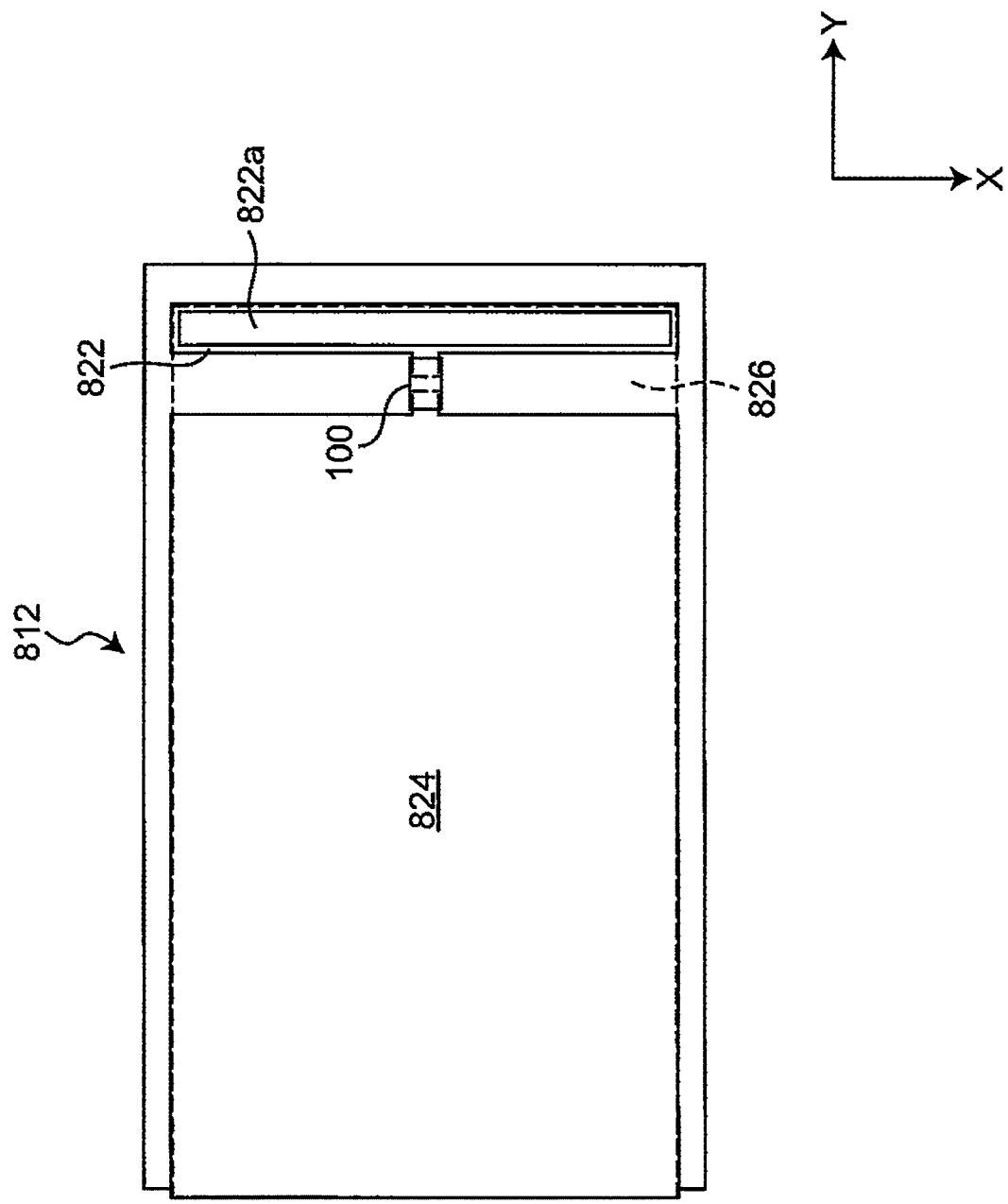
FIG. 18 is a top view of a wireless communication module of a wireless communication device according to a different exemplary embodiment.

Furthermore, for example, a wireless communication module 812 of a wireless communication device according to a different embodiment shown in FIG. 18 has a first radiation electrode 822 including a through-hole 822a. In particular, the first radiation electrode 822 is annular. As a result, the stray capacitance between the first radiation electrode 822 and a back surface electrode 826 decreases as compared to when the through-hole 822a is not included. Consequently, the radiation efficiency of radio waves of the first radiation electrode 822 is improved as compared to when the through-hole 822a is not included.

Regarding the stray capacitance between the first radiation electrode and the back surface electrode, if the thickness of the dielectric substrate therebetween is extremely thin, the area of the portion of the back surface electrode opposite to the first radiation electrode may be made extremely small, for example, zero. Therefore, the back surface electrode is disposed not to be opposite to the first radiation electrode.

Figure 19:
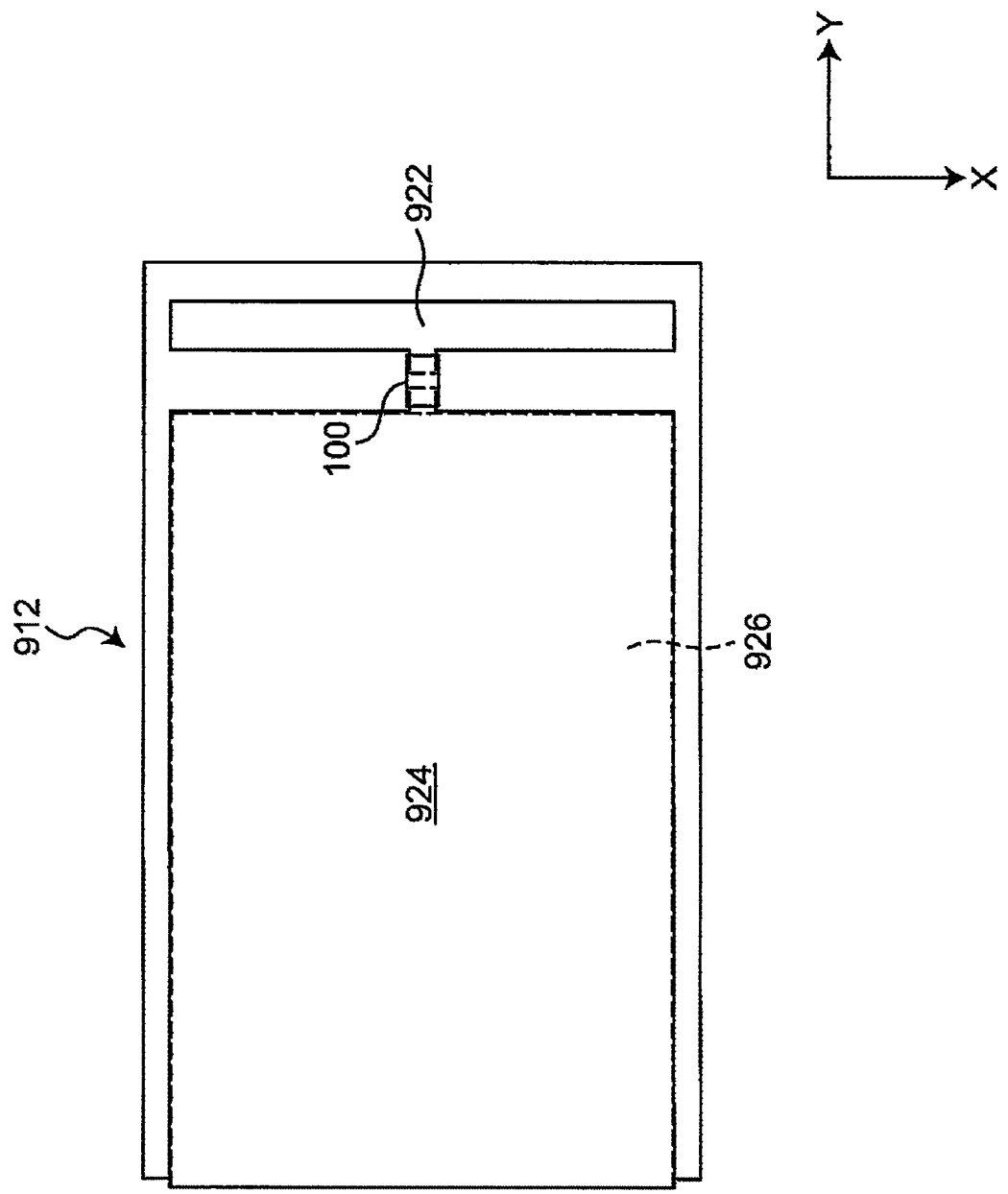
FIG. 19 is a top view of a wireless communication module of a wireless communication device according to another exemplary embodiment.
Figure 20:
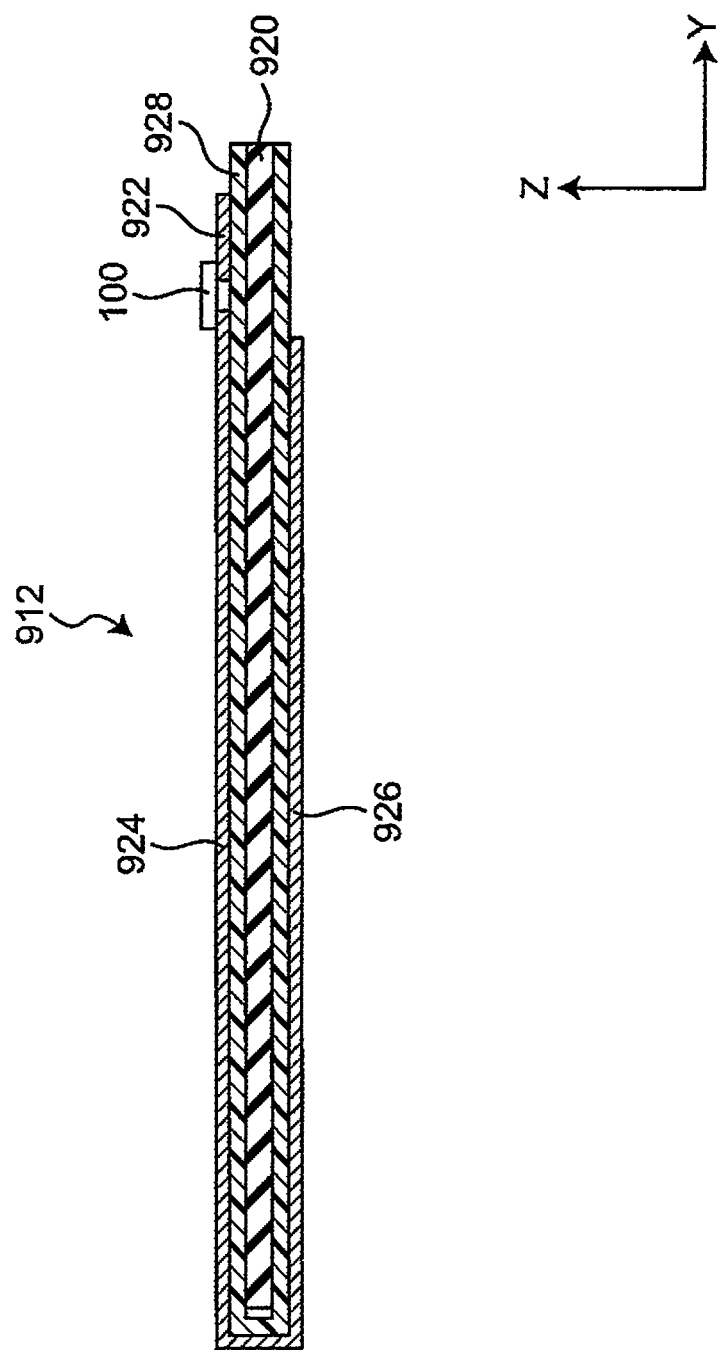
FIG. 20 is a cross-sectional view of the wireless communication module shown in FIG. 19.

FIGS. 19 and 20 are a top view and a cross-sectional view of a wireless communication module of a wireless communication device according to a further exemplary embodiment.

In a wireless communication module 912 shown in FIGS. 19 and 20, a portion of a back surface electrode 926 does not extend opposite to a first radiation electrode 922. In other words, the first radiation electrode 922 and the back surface electrode 926 are not opposite to each other in the thickness direction (Z-axis direction). Therefore, the stray capacitance is minimized between the first radiation electrode 922 and the back surface electrode 926. As a result, even when a dielectric substrate 920 is extremely thin, the first radiation electrode 922 can radiate radio waves with high radiation efficiency.

When the wireless communication device having the wireless communication module 912 is attached to a metal surface of an article, for example, the gas cylinder GC as shown in FIG. 11, a stray capacitance is generated between the first radiation electrode 922 and the metal surface of the article. However, the extremely thin dielectric substrate 920, the attachment part 14a of the protective case 14, and the seal member 16 are present between the first radiation electrode 922 and the metal surface of the article. Therefore, the first radiation electrode 922 and the metal surface of the article are sufficiently separated from each other.

Thus, comparing the stray capacitance when the first radiation electrode 922 and the back surface electrode 926 are opposite to each other across the extremely thin dielectric substrate 920 in the thickness direction and the stray capacitance when the first radiation electrode 922 is opposite to the metal surface of the article across the dielectric substrate 90, the attachment part 14a of the protective case 14, and the seal member 16, the stray capacitance is smaller in the latter case. Therefore, as shown in FIGS. 19 and 20, the wireless communication device having the back surface electrode 926 not opposite to the first radiation electrode 922 in the thickness direction can radiate radio waves with high radiation efficiency even when attached to the metal surface of the article. Therefore, considering the radiation efficiency, the back surface electrode 926 preferably does not extend opposite to the first radiation electrode 922 when the dielectric substrate is extremely thin.

As a supplement, as described above and as shown in FIG. 5, the resonance circuit is formed by the second radiation electrode and the portion of the back surface electrode opposite thereto, and the resonance frequency of the wireless communication device is thereby determined. Thus, even when the area of the portion of the back surface electrode opposite to the first radiation electrode is zero (even when no back surface electrode is present at a position opposite to the first radiation electrode in the thickness direction), the communication characteristics of the wireless communication device are substantially unchanged.

In the case of the exemplary embodiment described above, as shown in FIG. 4A, the first radiation electrode 22, the second radiation electrode 24, and the back surface electrode 26 are formed on the support film 28. By affixing the support film 28 to the dielectric substrate 20, these electrodes 22, 24, 26 are disposed on the dielectric substrate 20. The second radiation electrode 24 and the back surface electrode 26 are made up of one metal film on the support film 28. However, exemplary embodiments of the present disclosure are not limited thereto.

For example, the first radiation electrode, the second radiation electrode, and the back surface electrode may all directly be disposed on the dielectric substrate without using a support film. In this case, the second radiation electrode on the front surface of the dielectric substrate and the back surface electrode on the back surface may electrically be connected through a through-hole or a via hole, for example.

Furthermore, in the case of the embodiment described above, as shown in FIG. 1, the wireless communication module 12 of the wireless communication device 10 is housed and protected in the protective case 14. However, exemplary embodiments of the present disclosure are not limited thereto.

Figure 21:
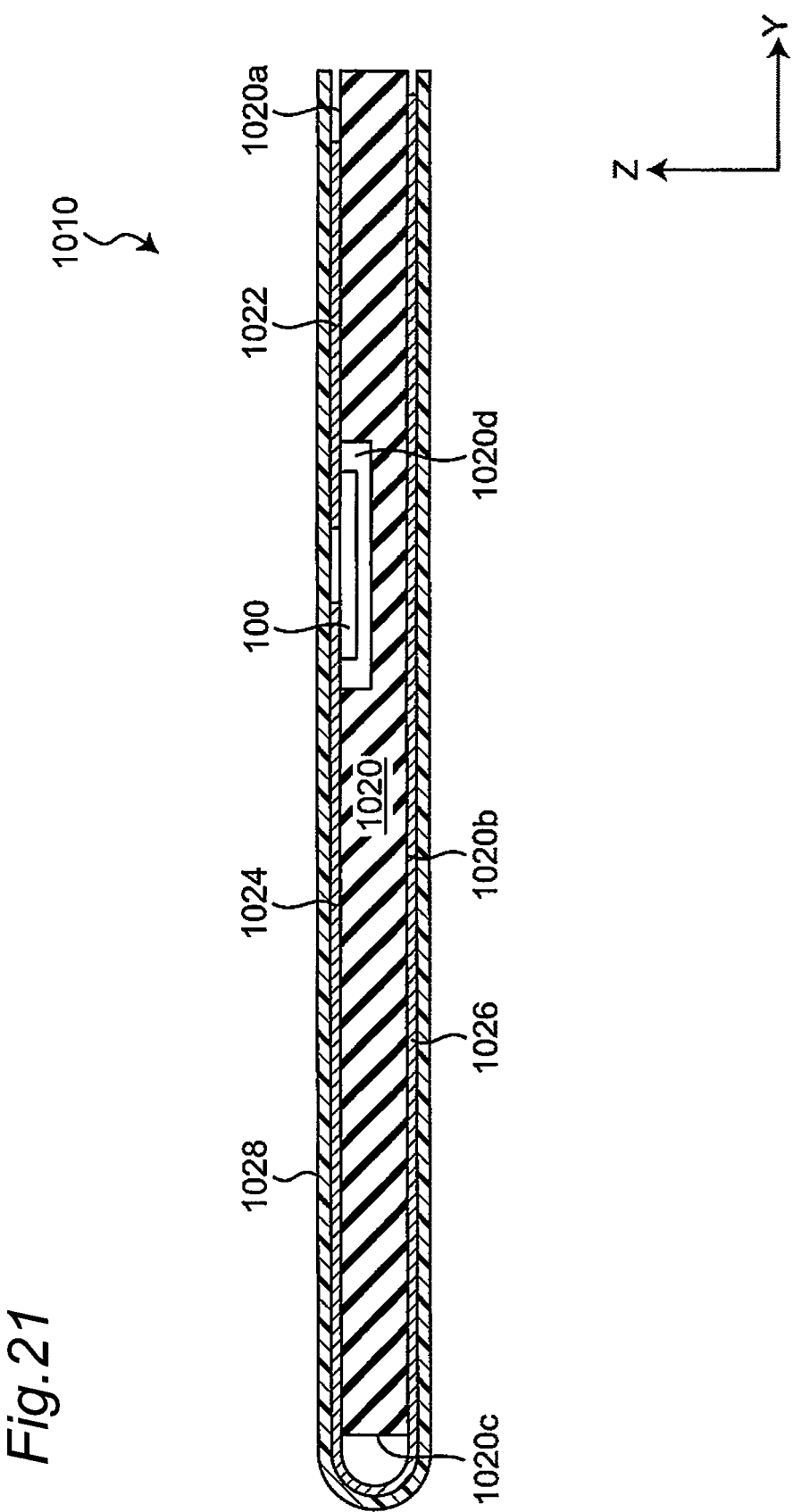
FIG. 21 is a cross-sectional view of a wireless communication device according to a yet further exemplary embodiment.

FIG. 21 shows a wireless communication device 1010 according to a yet further exemplary embodiment. The wireless communication device 1010 has a first radiation electrode 1022, a second radiation electrode 1024, and a back surface electrode 1026 formed on a support film 1028. This is the same as the wireless communication device 10 of the embodiment described above having the first radiation electrode 22, the second radiation electrode 24, and the back surface electrode 26 formed on the support film 28 as shown in FIG. 4A.

However, the affixing of the support film 1028 to a dielectric substrate 1020 is different from the affixing of the support film 28 to the dielectric substrate 20 in the wireless communication device 10 according to the embodiment described above.

Specifically, unlike the wireless communication device 10 of the embodiment described above, the wireless communication device 1010 of this embodiment has the support film 1028 affixed to the dielectric substrate 1020 such that the first radiation electrode 1022, the second radiation electrode 1024, and the back surface electrode 1026 are arranged between the support film 1028 and the dielectric substrate 1020. Therefore, the first and second radiation electrodes 1022, 1024 are directly affixed to a front surface 1020a of the dielectric substrate 1020 and the back surface electrode 1026 is directly affixed to a back surface 1020b.

As a result, the support film 1028 serves to protect the first radiation electrode 1022, the second radiation electrode 1024, the back surface electrode 1026, and the RFIC element 100. Consequently, a protective case is not necessary for the wireless communication device 1010. In this case, as shown in FIG. 21, the dielectric substrate 1020 includes a recess 1020d for receiving the RFIC element 100.

Furthermore, in the case of the embodiment described above, the first radiation electrode, the second radiation electrode, and the back surface electrode are disposed on the dielectric substrate. For example, in the case of the wireless communication module 12 shown in FIG. 3, the first radiation electrode 22, the second radiation electrode 24, and the back surface electrode 26 are disposed on the dielectric substrate 20. However, exemplary embodiments of the present disclosure are not limited thereto.

Figure 22:
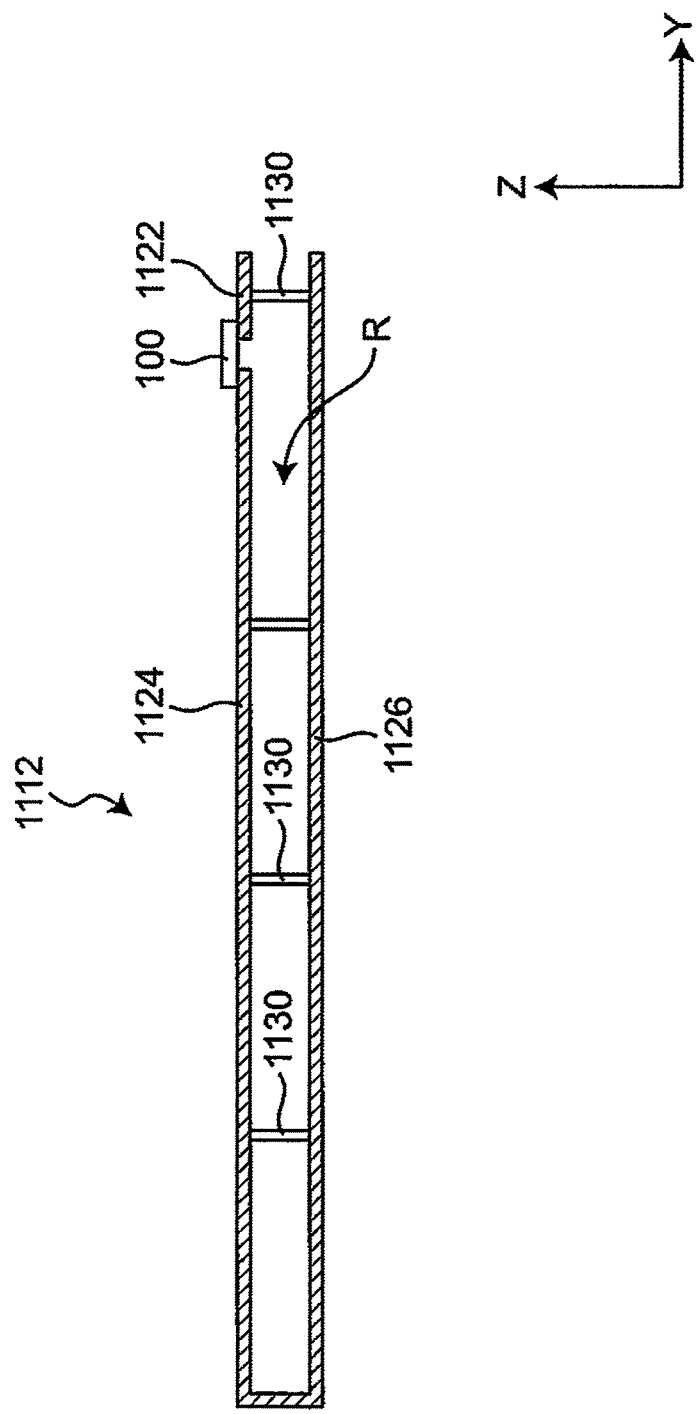
FIG. 22 is a cross-sectional view of a wireless communication device according to an exemplary embodiment without a dielectric substrate.

FIG. 22 shows a cross section of a wireless communication module 1112 according to an exemplary embodiment with an air layer disposed between electrodes instead of a dielectric substrate, i.e., without a dielectric substrate.

As shown in FIG. 22, the wireless communication module 1112 has an air layer R disposed between a first radiation electrode 1122 and a back surface electrode 1126 as well as between a second radiation electrode 1124 and the back surface electrode 1126. An electrode support member 1130 is disposed between the first radiation electrode 1122 and the back surface electrode 1126 as well as between the second radiation electrode 1124 and the back surface electrode 1126. This electrode support member 1130 provides the air layer R of a constant thickness between the first radiation electrode 1122 and the back surface electrode 1126 as well as between the second radiation electrode 1124 and the back surface electrode 1126. Consequently, a constant stray capacitance is formed therebetween.

Since the first radiation electrode 1122 and the back surface electrode 1126 are opposite to each other via the air layer R having a permittivity of approximately one, the capacity of the stray capacitance therebetween is made smaller than the capacity when a dielectric (object) exists therebetween. As a result, the first radiation electrode 1122 can radiate radio waves with higher radiation efficiency (as compared to when a dielectric (object) exists between the first radiation electrode 1122 and the back surface electrode 1126).

A method of maintaining the air layer between the first radiation electrode and the back surface electrode as well as the air layer between the second radiation electrode and the back surface electrode is not limited to the method using the electrode support member 1130.

Figure 23:
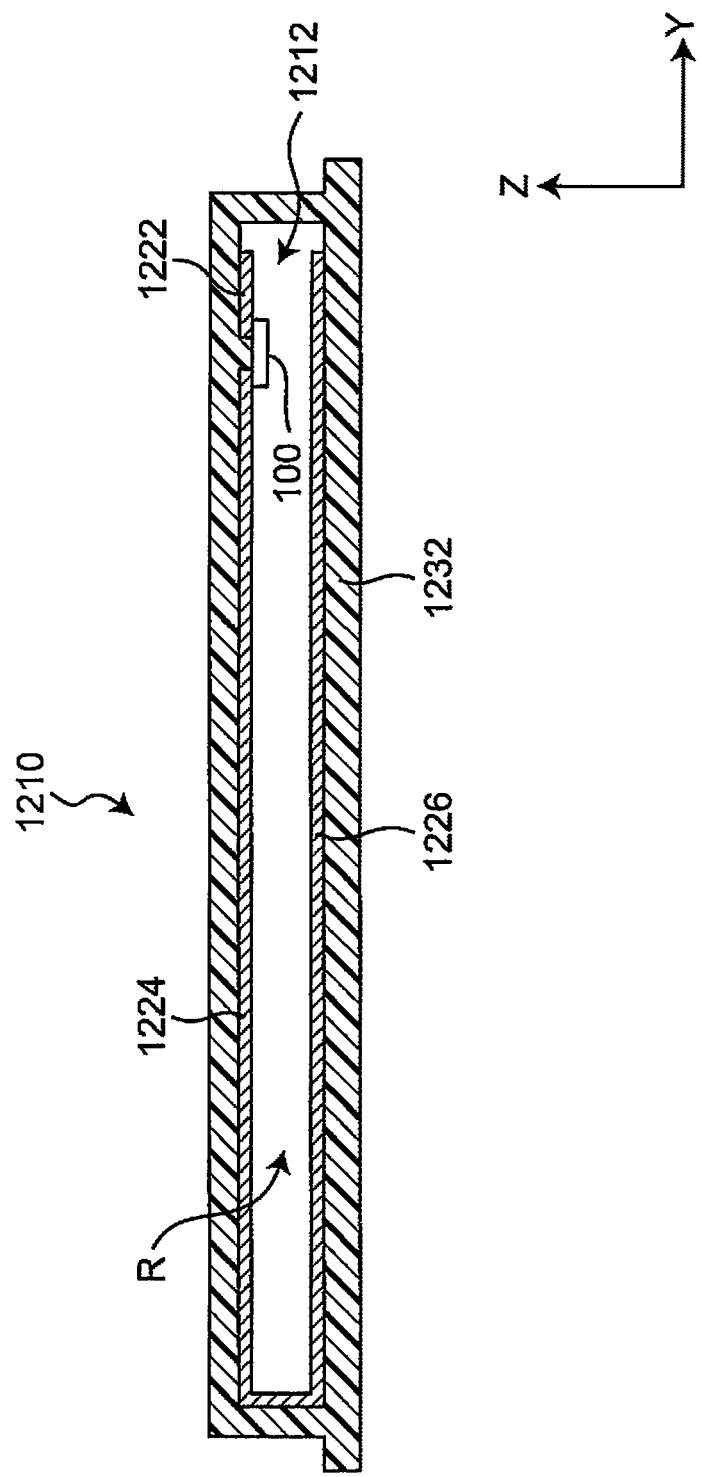
FIG. 23 is a cross-sectional view of a wireless communication device according to an alternative exemplary embodiment without a dielectric substrate.

For example, FIG. 23 shows a cross section of a wireless communication device 1210 of an alternative embodiment of the embodiment shown in FIG. 22.

The wireless communication device 1210 shown in FIG. 23 has a protective case 1232 including an internal space R. A first radiation electrode 1222, a second radiation electrode 1224, and a back surface electrode 1226 are disposed on an inner surface of the protective case 1232 defining the internal space R. Even in this wireless communication device 1210, the first radiation electrode 1222 can radiate radio waves with higher radiation efficiency (as compared to when a dielectric (object) exists between the first radiation electrode 1222 and the back surface electrode 1226).

Furthermore, as described above, the wireless communication device according to the exemplary embodiments of the present disclosure is usable even when attached to an article made of a metal material or an article made of a dielectric material. For example, the device can be attached to various articles such as the gas cylinder GC as shown in FIG. 11, a cart, and an electric appliance before use.

If the article is made of a metal material (i.e., a metal surface is included), the wireless communication device has the back surface electrode capacitively coupled to the metal surface and can use the metal surface as an antenna so as to perform long-distance wireless communication. Particularly, when the article is partially made of a non-magnetic metal material such as aluminum, silver, and copper, the wireless communication device can perform longer-distance wireless communication as compared to when attached to an article made of a magnetic metal material such as steel.

As described above, the communication distance of the wireless communication device differs depending on the type of the article to which the wireless communication device is attached.

The wireless communication device may be configured such that the same long-distance wireless communication can be performed regardless of the type of the article to which the device is attached.

Figure 24:
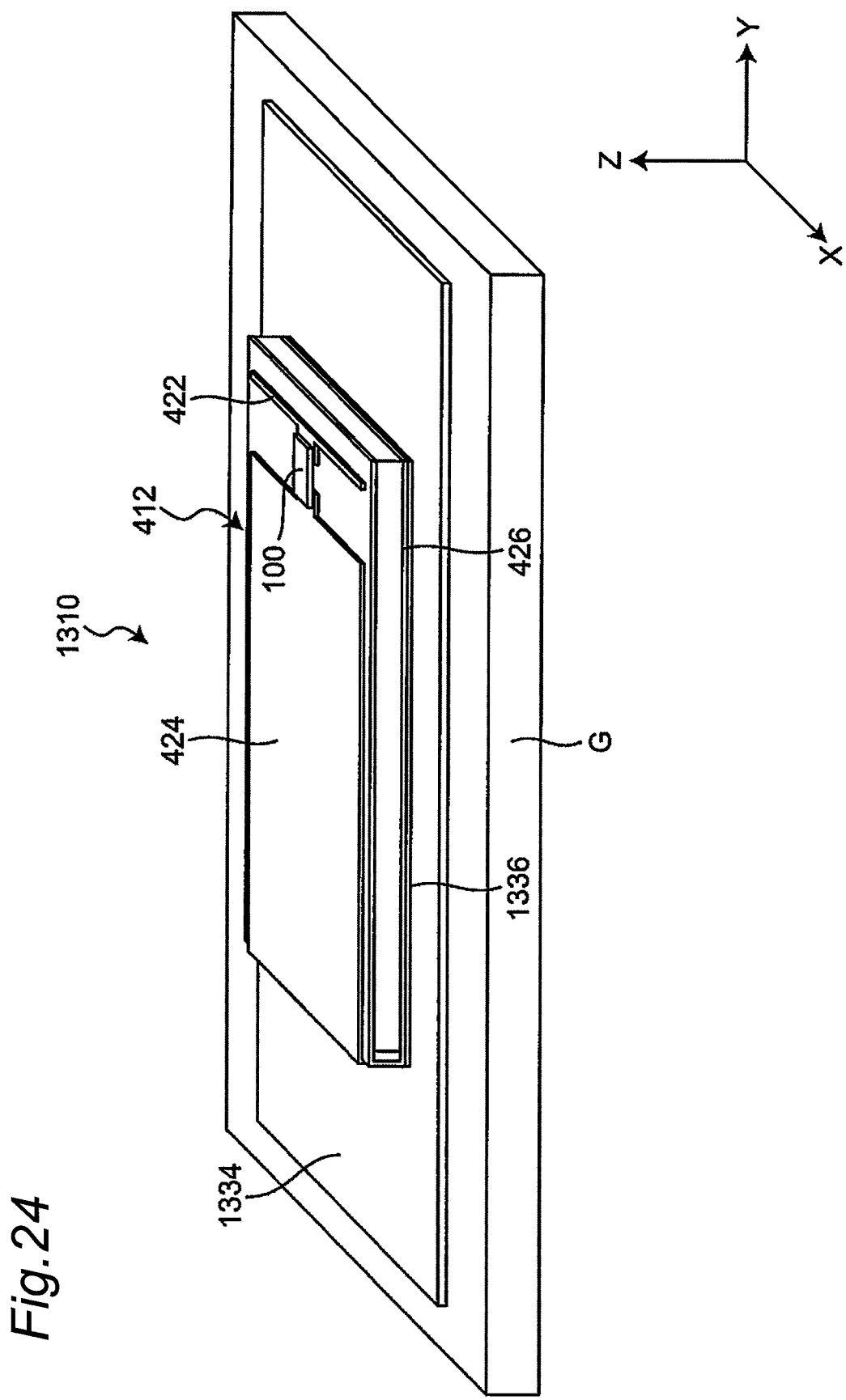
FIG. 24 is a perspective view of a wireless communication device according to an exemplary embodiment comprising an attachment part acting as an antenna.

FIG. 24 shows a wireless communication device 1310 according to another exemplary embodiment capable of performing long-distance wireless communication regardless of the type of the article to which the device is attached.

As shown in FIG. 24, the wireless communication device 1310 has the wireless communication module 412 and a plate-shaped attachment part 1334 affixed via a seal member 1336 to the back surface electrode 426 of the wireless communication module 412.

The attachment part 1334 is a thin flexible plate made of a non-magnetic metal material such as aluminum, for example, and is capacitively coupled to the back surface electrode 426 of the wireless communication module 412 via the seal member 1336. It is noted that the attachment part 1334 and the back surface electrode 426 may be galvanically connected by being bonded via a conductive adhesive etc.

The attachment part 1334 is affixed to an article G via a double-sided tape, for example.

The attachment part 1334 as described above functions as an antenna when affixed to the article G. Regardless of a type of the article G to which the wireless communication device 1310 is attached via the attachment part 1334, the attachment part 1334 functions as an antenna. Therefore, the wireless communication device 1310 can perform the long-distance wireless communication in the same way regardless of a type of the article G to which the device is attached.

The attachment part 1334 may be a separate component for the wireless communication module 412. By affixing the mounting part 1334 to the article G, the article G can be provided with a metal surface made of a surface of a non-magnetic metal material. By attaching the wireless communication device 1310 to the article G such that the back surface electrode 426 faces the metal surface, the wireless communication device 1310 can perform long-distance wireless communication.

Figure 25:
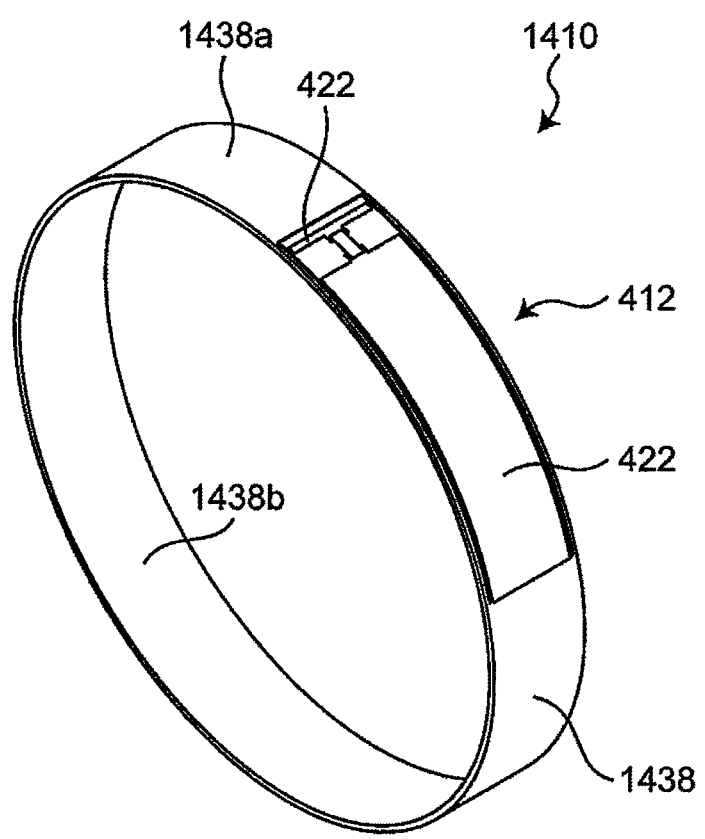
FIG. 25 is a perspective view of a wireless communication device according to an alternative exemplary embodiment comprising an attachment part acting as an antenna.

The attachment part to the article is not limited to the plate shape as shown in FIG. 24. For example, a wireless communication device 1410 shown in FIG. 25 includes a ring-shaped attachment part 1438. The ring-shaped attachment part 1438 is a flexible ring (short tube) made of a non-magnetic metal material such as aluminum. The wireless communication module 412 is attached to the ring-shaped attachment part 1438 such that the back surface electrode faces an outer surface 1438a thereof. As a result, the outer surface 1438a of the attachment part 1438 functions as an antenna. An inner surface 1438b of the ring-shaped mounting part 1438 may be protected by a resin layer or the like.

The attachment part 1438 as described above can be mounted on the exterior of various objects. The part can be mounted not only on a non-living object but also on a plant or an animal, for example, a wrist or an ankle of an animal. Additionally, since the outer surface 1438a of the attachment part 1438 functioning as an antenna has an endless shape, the wireless communication device 1410 can radiate radio waves through the outer surface 1438a in the directions of 360°. Therefore, for example, even when mounted on a human wrist, the device can radiate radio waves from a portion of the outer surface 1438a of the attaching portion 1438 opposite to the wireless communication module 412 across the wrist.

Furthermore, in the case of the embodiment described above, the wireless communication device 10 has flexibility so as to be attachable not only to a flat surface but also to a curved surface. However, exemplary embodiments are not limited thereto. For example, the wireless communication device may have a flat plate shape including a flat surface, or may have a curved plate shape including a curved surface, without flexibility.

Additionally, the wireless communication device may be configured to expand a band of communication signal frequency (i.e., resonance frequency) so as to enhance the versatility.

Figure 26:
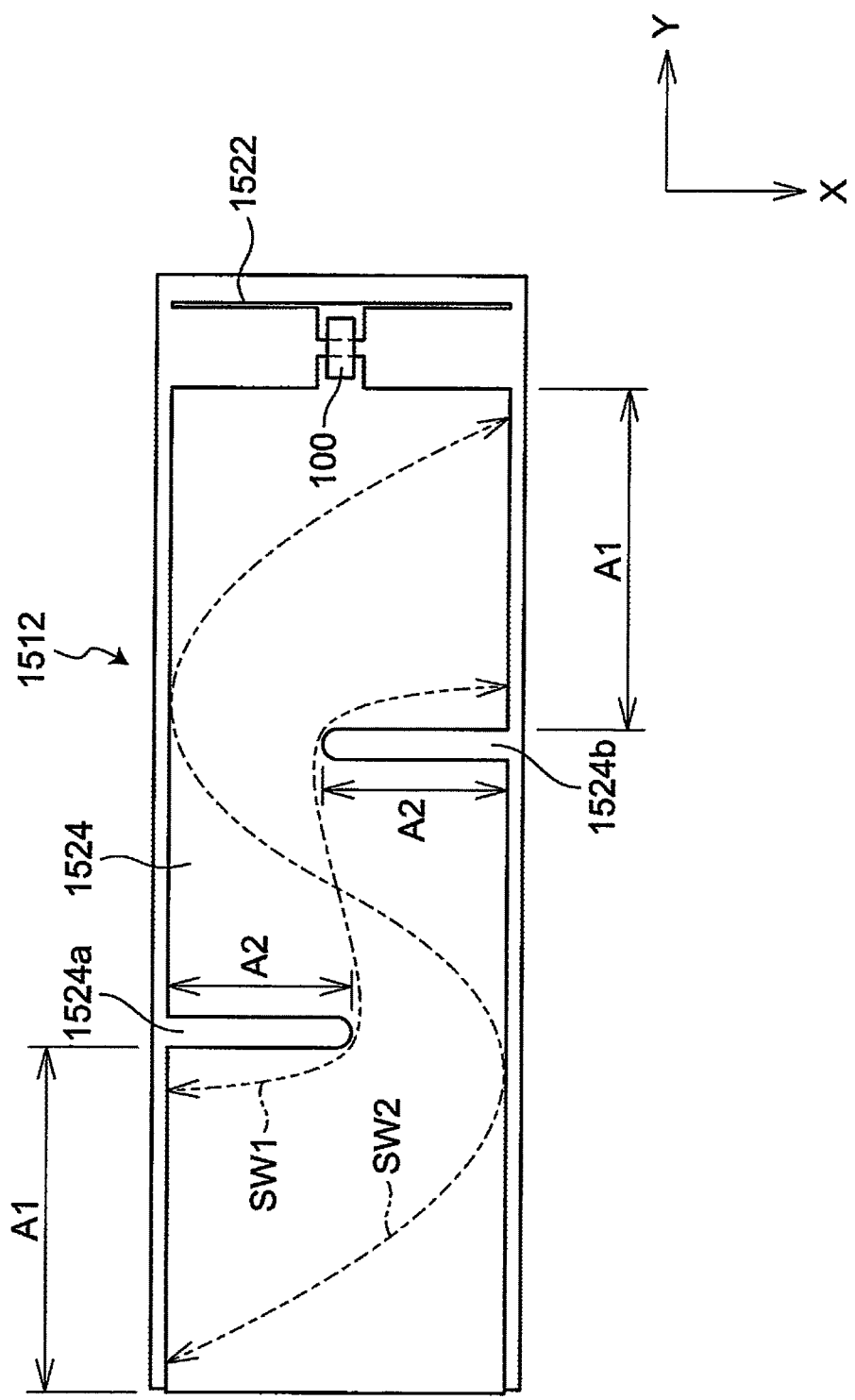
FIG. 26 is a top view of a wireless communication module according to a yet further exemplary embodiment.

FIG. 26 shows a wireless communication module of a wireless communication device configured to expand the resonance frequency band.

As described in the exemplary embodiment, the resonance frequency of a wireless communication module 1512 is determined by a second radiation electrode 1524. In the case of this embodiment, multiple notches 1524a, 1524b are formed in the second radiation electrode 1524 so as to expand the resonance frequency band of the wireless communication module 1512.

Specifically, the second radiation electrode 1524 includes the first notch 1524a disposed at one end in the width direction (X-axis direction) and extending toward the center (or beyond the center) in the width direction. The electrode also includes the second notch 1524b disposed at the other end in the width direction and extending toward the center (or beyond the center) in the width direction.

The first notch 1524a and the second notch 1524b have a shape of a slit (a recess elongated in the width direction), for example. The first notch 1524a and the second notch 1524b are arranged at an interval in the length direction (Y-axis direction). Furthermore, in the case of this embodiment, a distance between the first notch 1524a and one end (the end far from a first radiation electrode 1522) of the second radiation electrode 1524 in the length direction and a distance between the second notch 1524b and the other end of the second radiation electrode 1524 in the length direction are the same A1. Furthermore, the lengths of the first notch 1524a and the second notch 1524b in the width direction are the same A2.

Figure 27:
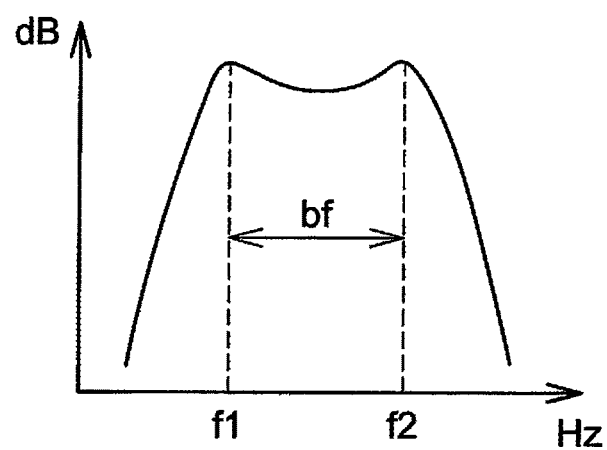
FIG. 27 is a diagram of frequency characteristics of a communication signal of the wireless communication device shown in FIG. 26.

According to the second radiation electrode 1524 having such a configuration, the wireless communication module 1512 has frequency characteristics shown in FIG. 27. Specifically, as shown in FIG. 27, the module has the frequency characteristics with a high antenna gain in a wide bandwidth bf between frequencies f1 (e.g., 860 MHz) and f2 (e.g., 930 MHz).

The bandwidth bf shown in FIG. 27 is determined by the distance A1 shown in FIG. 26. Specifically, as shown in FIG. 26, in the second radiation electrode 1524, two different resonance modes occur (two different standing waves SW1, SW2 are generated). In particular, the standing wave SW1 having the shortest wavelength and the frequency of f2 is generated in the second radiation electrode 1524. The standing wave SW2 having the maximum wavelength and the frequency of f1 is also generated in the second radiation electrode 1524. Due to coupling of the resonance mode in which the standing wave SW1 is generated and the resonance mode in which the standing wave SW2 is generated, the frequency band of the communication signal is expanded. The bandwidth bf is proportional to the distance A1 shown in FIG. 26. Therefore, by appropriately setting the distance A1, the desired bandwidth bf of the resonance frequency can be acquired. For the lower limit frequency f1 and the upper limit frequency f2 of the resonance frequency band, desired values can be acquired by appropriately setting the lengths (in the X-axis direction) of the first and second notches 1524a, 1524b. Consequently, the wireless communication module 1512 of the wireless communication device has an expanded band of the communication signal frequency (i.e., the resonance frequency) and thus can be used for various applications (the versatility is enhanced).

In the case of the wireless communication module 1512 shown in FIG. 26, the second radiation electrode 1524 has the one first notch portion 1524a disposed at one end in the width direction (X-axis direction) and the one second notch 1524b disposed at the other end. Alternatively, for example, the multiple first notches 1524a may be disposed and the multiple second notches 1524b may be disposed. In this case, the multiple first notches 1524a and the multiple second notches 1524b are alternately arranged at equal intervals in the length direction (Y-axis direction) of the second radiation electrode 1524. Alternatively, for example, only the one first notch 1524a or only the one second notch 1524b may be disposed in the second radiation electrode 1524.

Additionally, the wireless communication module of the wireless communication device can have a configuration other than those of the wireless communication module 12 shown in FIG. 2, the wireless communication module 1112 shown in FIG. 22, and the wireless communication module 1212 shown in FIG. 23.

Figure 28:
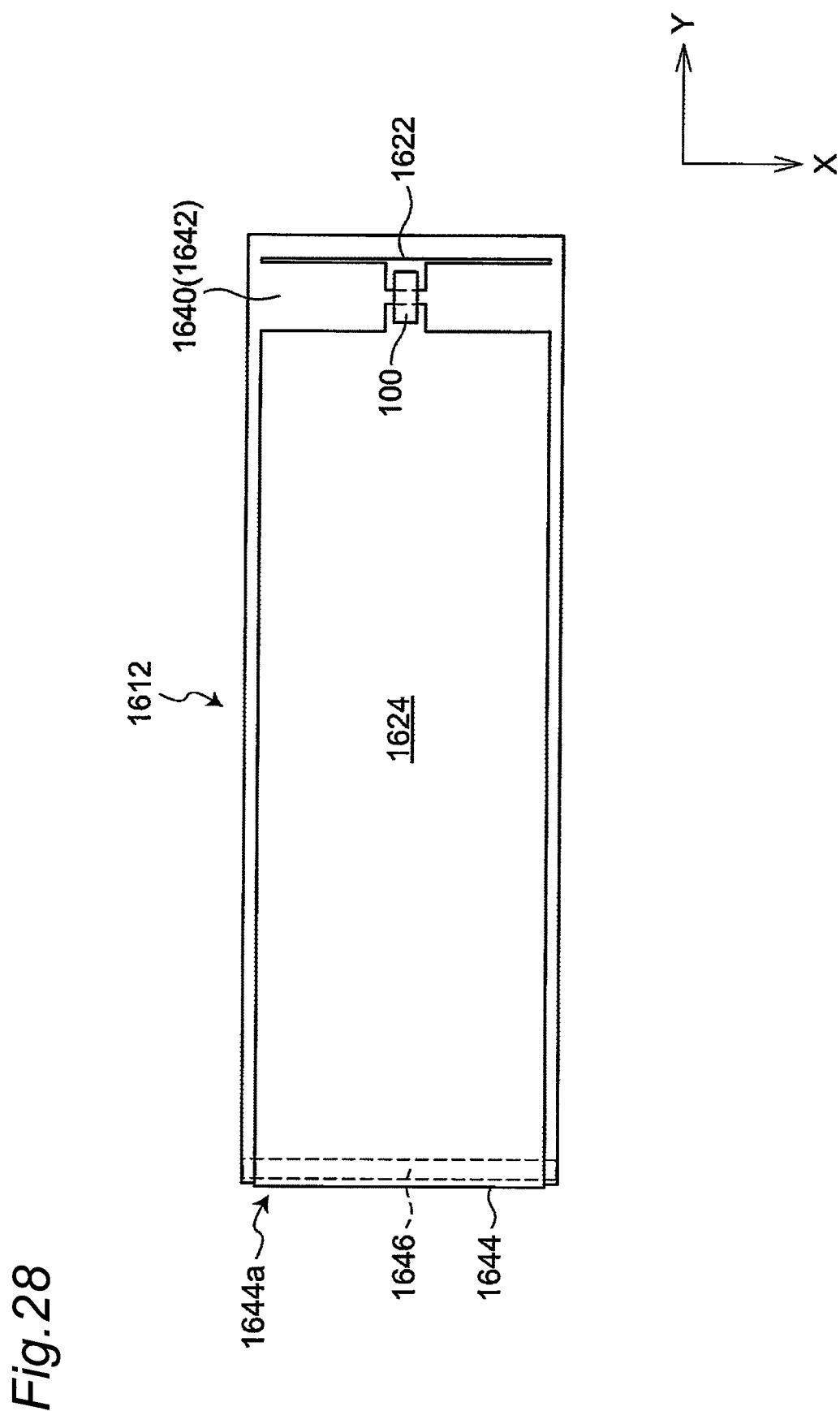
FIG. 28 is a top view of a wireless communication module according to a yet further exemplary embodiment.
Figure 29:
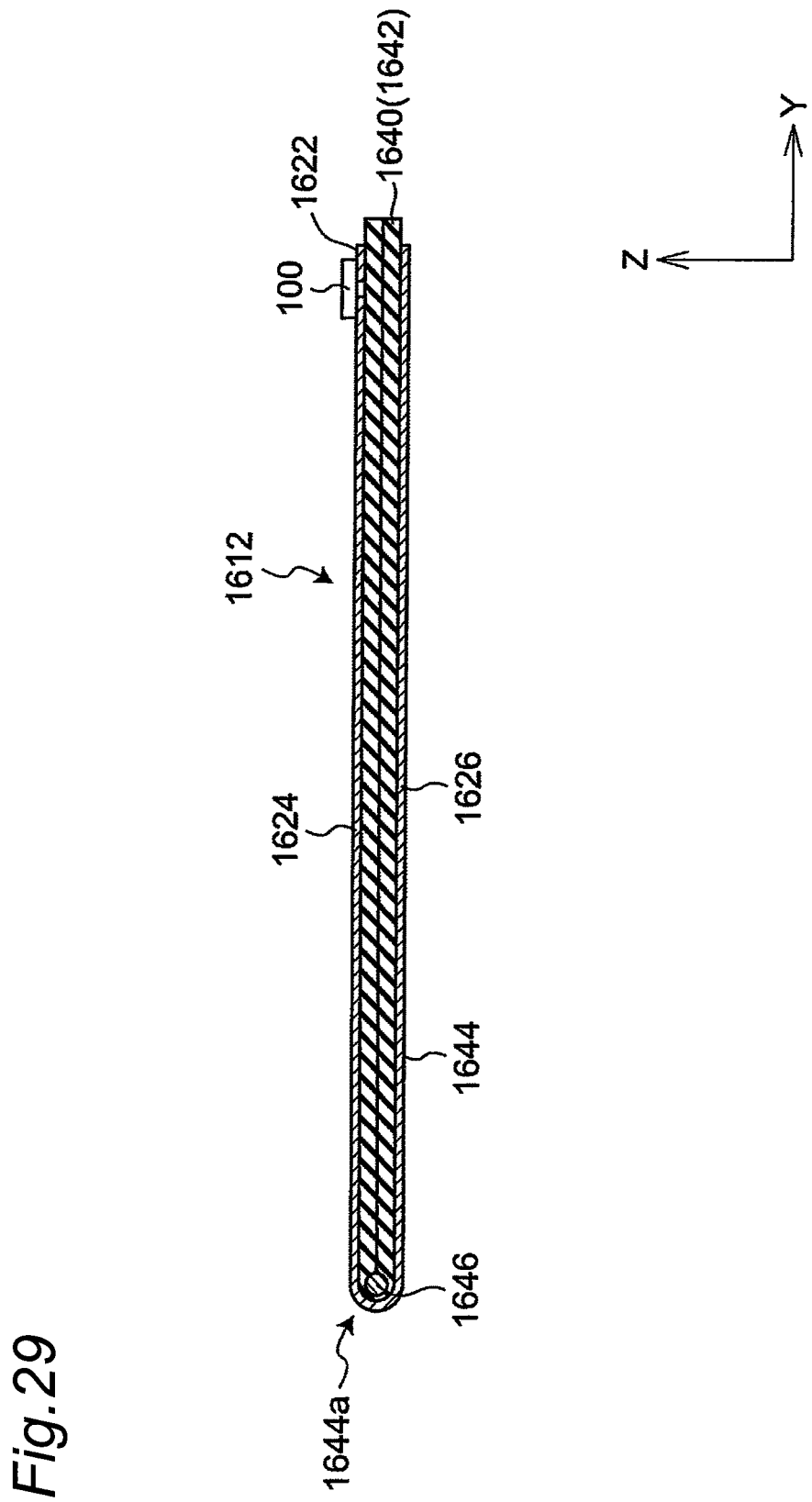
FIG. 29 is a cross-sectional view of the wireless communication module shown in FIG. 28.
Figure 30:
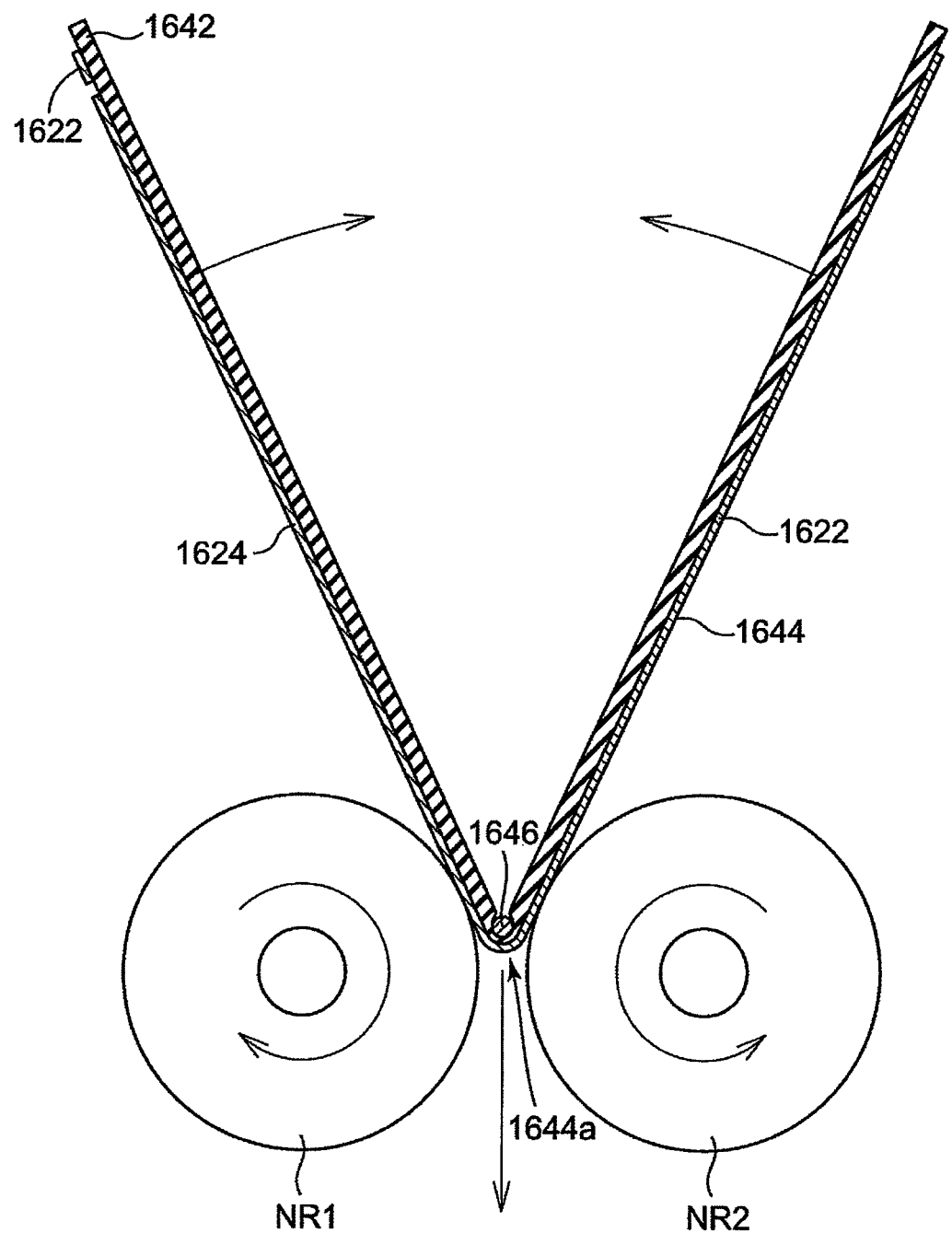
FIG. 30 is a diagram of an example of a fabrication method of the wireless communication module shown in FIG. 28.

For example, FIG. 28 is a top view of a wireless communication module according to a yet further exemplary embodiment, and FIG. 29 is a cross-sectional view of the wireless communication module. FIG. 30 shows an example of a fabrication method of the wireless communication module.

As shown in FIGS. 28 to 30, a wireless communication module 1612 includes a dielectric substrate 1640 made of an elastic material such as urethane resin, for example. Specifically, as shown in FIG. 30, the dielectric substrate 1640 is formed by folding a thin dielectric sheet 1642 made of an elastic material in half and bonding the sheet together. Therefore, a first radiation electrode 1622, a second radiation electrode 1624, and a back surface electrode 1626 are disposed on one surface of the dielectric sheet 1642.

As shown in FIG. 30, the dielectric sheet 1642 folded in half with the one surface provided with the three electrodes 1622, 1624, and 162 facing outwards relatively passes through between paired nip rollers NR1, NR2. As a result, the surface without the electrodes is completely folded in half and bonded together, and the dielectric substrate 1640 is consequently formed.

As shown in FIG. 29, the second radiation electrode 1624 and the back surface electrode 1626 are made up of one metal sheet 1644 (e.g., an aluminum sheet). By folding the one metal sheet 1644 in half together with the dielectric sheet 1642, the second radiation electrode 1624 is disposed on one surface (front surface) of the dielectric substrate 1640 and the back surface electrode 1626 is disposed on the other surface (back surface).

The dielectric substrate 1640 is formed by folding the thin dielectric sheet 1642 made of an elastic material in half and is therefore thin and deformable. Thus, the wireless communication module 1612 is also deformable. In this case, for example, if a folded portion 1644*a* of the metal sheet 1644 is repeatedly deformed due to repeated deformation of the dielectric substrate 1640 during handling, cracking may occur in the folded portion 1644*a*. When cracking occurs, the electrical connection characteristics are changed between the second radiation electrode 1624 and the back surface electrode 1626, and the frequency characteristics of the wireless communication module 1612 are consequently changed.

To suppress the deformation of the folded portion 1644*a* of the metal sheet 1644, as shown in FIGS. 28 and 29, a core member 1646 is disposed at one end of the dielectric substrate 1640 in the folded portion 1644*a*.

This core member 1646 is a rod-like member extending in the extending direction of the fold line of the metal sheet 1644, i.e., the width direction (X-axis direction) of the wireless communication module 1612. The core member 1646 is made of, for example, a stainless steel material having a rigidity at least higher than the dielectric substrate 1640 (the dielectric sheet 1642), more preferably a rigidity higher than the metal sheet 1644.

As shown in FIG. 30, the core member 1646 is present in the dielectric substrate 1640, i.e., between the halves of the folded dielectric sheets 1642. In other words, the dielectric sheet 1642 is folded in half along the core member 1646. Consequently, the core member 1646 is located in the folded portion 1644*a* of the metal sheet 1644. The core member 1646 suppresses the deformation of the dielectric substrate 1640 in the folded portion 1644*a* of the metal sheet 1644 and thereby suppresses the deformation of the folded portion 1644*a* so as to restrain the occurrence of cracking in the folded portion 1644.

By folding the metal sheet 1644 in half together with the dielectric sheet 1642 along the core member 1646, the curvature radius of the folded portion 1644*a* of the metal sheet 1644 becomes larger as compared to when the core member 1646 is not included. If the core member 1646 is not included, the curvature radius of the folded portion 1644*a* of the metal sheet 1644 becomes smaller, and the outer surface of the metal sheet 1644 is locally significantly distorted and deformed. Cracking tends to occur in such a locally significantly distorted/deformed portion.

As shown in FIG. 30, since the sheet is folded in half along the core member 1646 while passing between the paired nip rollers NR1, NR2, a portion of the dielectric sheet 1642 on one side relative to the core member 1646 and a portion on the other side relative to the core member 1646 can wholly be overlapped with each other. Therefore, fold lines extending in the width direction (X-axis direction) along the core member 1646 are formed on the dielectric sheet 1642 and the metal sheet 1644.

The core member 1646 capable of restrain the occurrence of cracking in the folded portion 1644*a* of the metal sheet 1644 and functioning as a guide of folding of the dielectric sheet 1642 in half in this way is preferably made of an insulating material. However, as shown in FIG. 29, if a distance (electrical insulation) between the metal sheet 1644 and the core member 1646 is secured, the member may be made of a metal material.

The wireless communication module 1612 including the thin dielectric substrate 1640 made of an elastic material as described above can be attached to a curved surface with a small curvature radius before use.

Additionally, the wireless communication device according to the exemplary embodiments of the present disclosure is not limited to being used for transmission/reception of a signal of a frequency in the UHF band and is usable for transmitting/receiving signals of frequencies in various bands. The wireless communication device according to the embodiments of the present invention may be used for transmitting/receiving a signal of a frequency of the HF band, for example.

Although the present invention has been described with a plurality of embodiments, it is apparent for those skilled in the art that at least one embodiment can entirely or partially be combined with a certain embodiment to form a further embodiment according to the present invention.

In general, the present disclosure is applicable to any wireless communication device having an electrode radiating a radio wave and another electrode opposite to the electrode.

EXPLANATIONS OF LETTERS OR NUMERALS

20 dielectric substrate
20*a* front surface
20*b* back surface
22 first radiation electrode
24 second radiation electrode
26 back surface electrode
100 RFIC element
102 first terminal electrode
104 second terminal electrode

The invention claimed is:

1. A wireless communication device comprising:
an RFIC element including first and second terminal electrodes;
a first radiation electrode connected to the first terminal electrode of the RFIC element;
a second radiation electrode disposed in a same plane as the first radiation electrode and connected to the second terminal electrode of the RFIC element, wherein the first and second radiation electrodes are disposed on a dielectric substrate and are not directly connected to each other; and
a back surface electrode disposed in a plane different and separate from the same plane of the first and second radiation electrodes and further disposed opposite to at least the second radiation electrode with a distance therebetween, with the back surface electrode being connected to the second radiation electrode and not connected to the first radiation electrode,
wherein the first radiation electrode is disposed only on a front surface of the dielectric substrate and is only connected to the first terminal electrode, and
wherein a first portion of the back surface electrode that is opposite to the first radiation electrode has an area that is smaller than an area of a second portion of the back surface electrode that is opposite to the second radiation electrode.

2. The wireless communication device according to claim 1, wherein the first and second radiation electrodes are disposed on the front surface of the dielectric substrate, and the back surface electrode is disposed on a back surface of the dielectric substrate.

3. The wireless communication device according to claim 2, wherein the dielectric substrate, the first radiation electrode, the second radiation electrode, the back surface electrode, and the RFIC element are comprised of a flexible material.

4. The wireless communication device according to claim 1, further comprising an air layer disposed between the first and second radiation electrodes and the back surface electrode.

5. The wire communication device according to claim 1, wherein the back surface electrode and the second radiation electrode are comprised of a single metal film.

6. The wire communication device according to claim 1,
wherein the second radiation electrode and the back surface electrode are comprised of a single metal sheet folded at one end of the dielectric substrate, and
wherein the one end of the dielectric substrate comprises a core member having a rigidity higher than a rigidity of the dielectric substrate and extending in a direction of a fold line of the metal sheet.

7. The wireless communication device according to claim 1, wherein the first portion of the back surface electrode does not extend opposite the first radiation electrode in a thickness direction of the wireless communication device.

8. The wireless communication device according to claim 1, wherein the RFIC element includes:
an element substrate including the first and second terminal electrodes,
an RFIC chip disposed on the element substrate; and
a matching circuit disposed on the element substrate and configured to provide an impedance matching between the RFIC chip and the first and second radiation electrodes.

9. The wireless communication device according to claim 1, wherein the first radiation electrode has a width smaller than a width of the second radiation electrode and extends in a direction away from the RFIC element.

10. The wireless communication device according to claim 9,
wherein the wireless communication device has a first axis extending in a direction of the first and second radiation electrodes facing each other in the same plane and a second axis orthogonal to the first axis in the same plane,
wherein the first radiation electrode has a length extending in the direction of the first axis that is smaller than a length extending in a direction of the second axis, and
wherein the second radiation electrode is connected to the back surface electrode in a portion on the side opposite in the direction of the first axis to a portion facing the first radiation electrode in the direction of the first axis.

11. The wireless communication device according to claim 10, wherein the second radiation electrode includes a first notch disposed at one end in the direction of the second axis and extending toward a center in the direction of the first axis.

12. The wireless communication device according to claim 11,
wherein the second radiation electrode includes a second notch disposed at the other end in the direction of the second axis and extending toward the center in the direction of the second axis, and
wherein the first notch and the second notch are arranged at an interval in the direction of the first axis.

13. The wireless communication device according to claim 10, wherein the length of the first radiation electrode extending in the direction of the first axis is smaller than $\frac{1}{50}$ of the length of the second radiation electrode extending in the direction of the first axis.

14. The wireless communication device according to claim 10, wherein the first radiation electrode includes a bending portion extending in the direction of the first axis from each of both ends in the direction of the second axis.

15. The wireless communication device according to claim 1, wherein the first radiation electrode includes a through-hole.

16. The wireless communication device according to claim 1, further comprising an attachment member disposed opposite to the back surface electrode and comprised of a non-magnetic metallic, and configured to attach the wireless communication device to an article.

17. The wireless communication device according to claim 16, wherein the attachment member comprises a ring shape.

18. A wireless communication device, comprising:
an RFIC element including first and second terminal electrodes;
a first radiation electrode connnected to the first terminal electrode of the RFIC element;
a second radiation electrode disposed in a same plane as the first radiation electrode and connected to the second terminal electrode of the RFIC element, wherein the first and second radiation electrodes are not directly connected to each other; and
a back surface electrode disposed opposite to at least the second radiation electrode with a distance therebetween, with the back surface electrode being connected to the second radiation electrode,
wherein a first portion of the back surface electrode that is opposite to the first radiation electrode has an area that is smaller than an area of a second portion of the back surface electrode that is opposite to the second radiation electrode,
wherein the first radiation electrode has a width smaller than a width of the second radiation electrode and extends in a direction away from the RFIC element,
wherein the wireless communication device has a first axis extending in a direction of the first and second radiation electrodes facing each other in the same plane and a second axis orthogonal to the first axis in the same plane,
wherein the first radiation electrode has a length extending in the direction of the first axis that is smaller than a length extending in a direction of the second axis,
wherein the second radiation electrode is connected to the back surface electrode in a portion on the side opposite in the direction of the first axis to a portion facing the first radiation electrode in the direction of the first axis,
wherein the length of the first radiation electrode extending in the direction of the first axis is smaller than $\frac{1}{50}$ of the length of the second radiation electrode extending in the direction of the first axis, and
wherein the length of the first radiation electrode extending in the direction of the first axis is smaller than $\frac{1}{100}$ of the length of the second radiation electrode extending in the direction of the first axis.

19. An article comprising:
a metal surface; and
a wireless communication device attached to the metal surface and including:

an RFIC element including first and second terminal electrodes, a first radiation electrode connected to the first terminal electrode of the RFIC element, a second radiation electrode disposed in the same plane as the first radiation electrode independently of the first radiation electrode and connected to the second terminal electrode of the RFIC element, wherein the first and second radiation electrodes are disposed on a dielectric substrate, and a back surface electrode disposed in a plane different and separate from the same plane of the first and second radiation electrodes and further disposed opposite to at least the second radiation electrode with a distance therebetween, with the back surface electrode being connected to the second radiation electrode and not connected to the first radiation electrode, wherein the first radiation electrode is disposed only on a front surface of the dielectric substrate and is only connected to the first terminal electrode, wherein the wireless communication device is attached to the metal surface such that the back surface electrode faces the metal surface, and wherein a first portion of the back surface electrode that is opposite to the first radiation electrode has an area that is smaller than an area of a second portion of the back surface electrode that is opposite to the second radiation electrode.

20. The article according to claim 19, wherein the metal surface of the article is a surface of a non-magnetic metal material.

\* \* \* \* \*